United States Patent [19]
Nagatani et al.

[11] Patent Number: 5,399,850
[45] Date of Patent: Mar. 21, 1995

[54] DOCUMENT READING APPARATUS, HAVING A BODY UNIT FOR HOLDING APPARATUS COMPONENTS

[75] Inventors: Kenichi Nagatani, Kokubu; Keitoku Morita, Aira; Hiroyuki Okushiba, Aira; Shinichi Kojima, Aira; Ryoichi Sakaguchi, Kagoshima, all of Japan

[73] Assignee: Kyocera Corporation, Kyoto, Japan

[21] Appl. No.: 997,444

[22] Filed: Dec. 28, 1992

[30] Foreign Application Priority Data

Dec. 26, 1991 [JP] Japan .................. 3-345230

[51] Int. Cl.⁶ .......................... H01J 40/14; H01J 3/14
[52] U.S. Cl. .................................. 250/208.1; 250/216; 358/496
[58] Field of Search ...................... 250/208.1, 239, 216; 358/213.11, 212, 213.13, 482, 483, 484, 496; 257/443

[56] References Cited

U.S. PATENT DOCUMENTS

| | | | |
|---|---|---|---|
| 4,644,411 | 2/1987 | Sato et al. | 250/208.1 |
| 4,739,159 | 4/1988 | Inokuchi | 250/208.1 |
| 4,774,592 | 9/1988 | Suzuki et al. | |
| 5,023,442 | 6/1991 | Taniguchi et al. | 250/208.1 |
| 5,038,027 | 8/1991 | Ioka | 250/208.1 |
| 5,142,137 | 8/1992 | Kushino et al. | 250/208.1 |
| 5,142,138 | 8/1992 | Yonezawa et al. | 250/208.1 |
| 5,182,445 | 1/1993 | Yamashita | 250/208.1 |

*Primary Examiner*—Edward P. Westin
*Assistant Examiner*—Stephone B. Allen
*Attorney, Agent, or Firm*—Spensley Horn Jubas & Lubitz

[57] ABSTRACT

A document reading apparatus comprises a light transmitting plate in contact with a document, a light source to light the document, a plurality of lenses arranged in line at a specified interval to image light reflected from the document and form a scaled-down document image, a plurality of semiconductor chips having a multiplicity of photoelectric transducer elements arranged in line respectively corresponding to each lens in order to receive the document image, a circuit wiring base plate on which semiconductor chips are placed, and a body unit to hold the light transmitting plate, the light source, and the circuit wiring base plate. The document image is formed in a scaled-down state by the plurality of lenses, and received by the plurality of semiconductor chips respectively corresponding to each lens. Since the document image is formed in a scaled-down state, it is not necessary to arrange the photoelectric transducer elements continuously between adjacent semiconductor chips. Therefore, a clearance can be kept between the semiconductor chips, and it is not necessary to arrange the photoelectric transducer elements substantially with the same length as the document, thereby a document reading apparatus which is handled as a part is constructed.

15 Claims, 16 Drawing Sheets

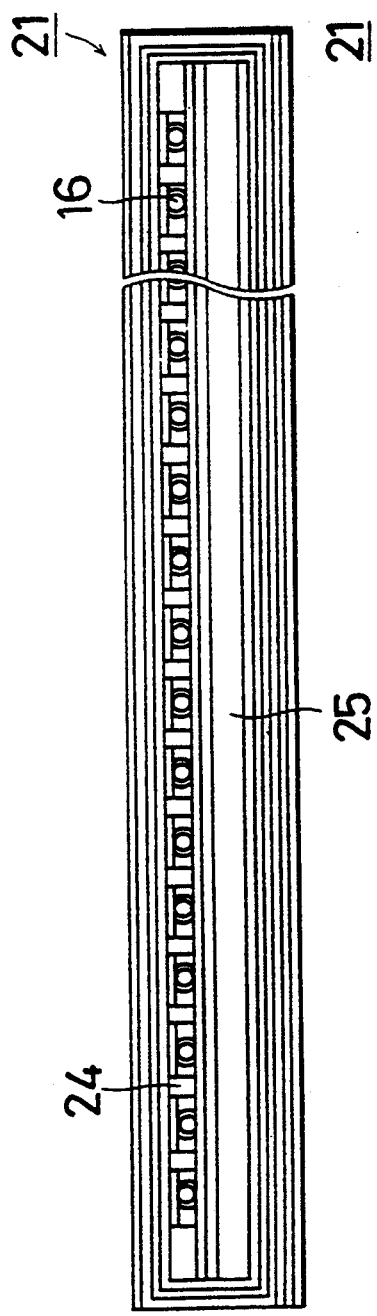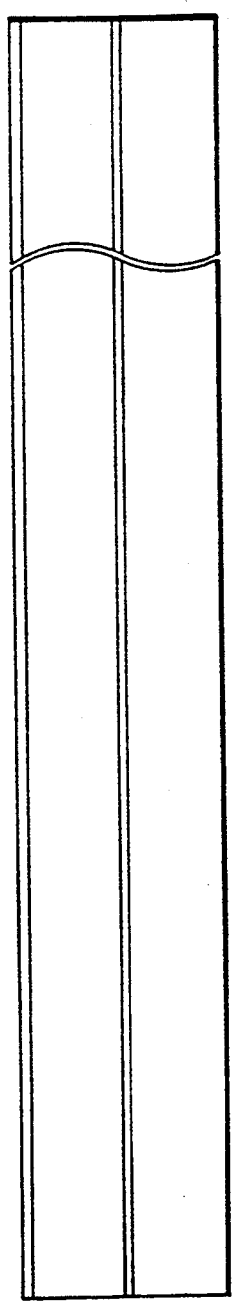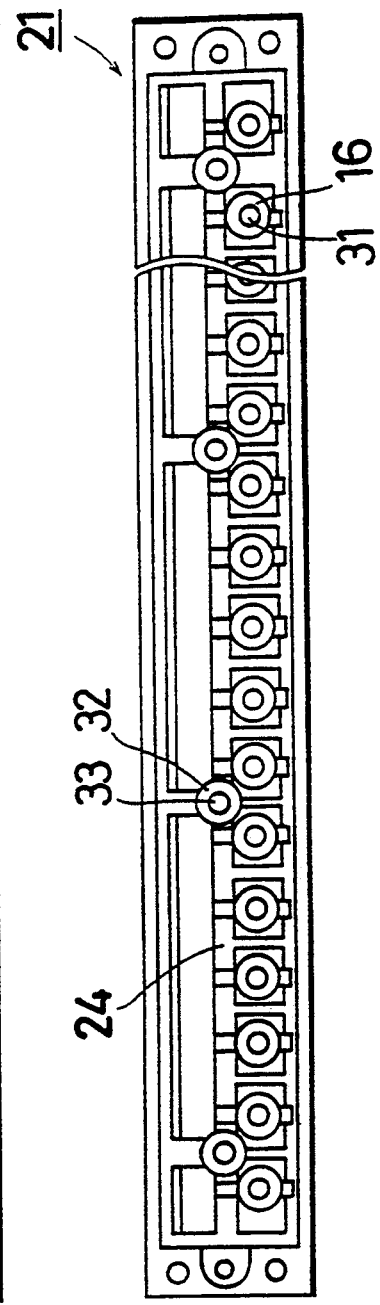
Fig. 6 (a) Fig. 6 (b) Fig. 6 (c)

Fig.19
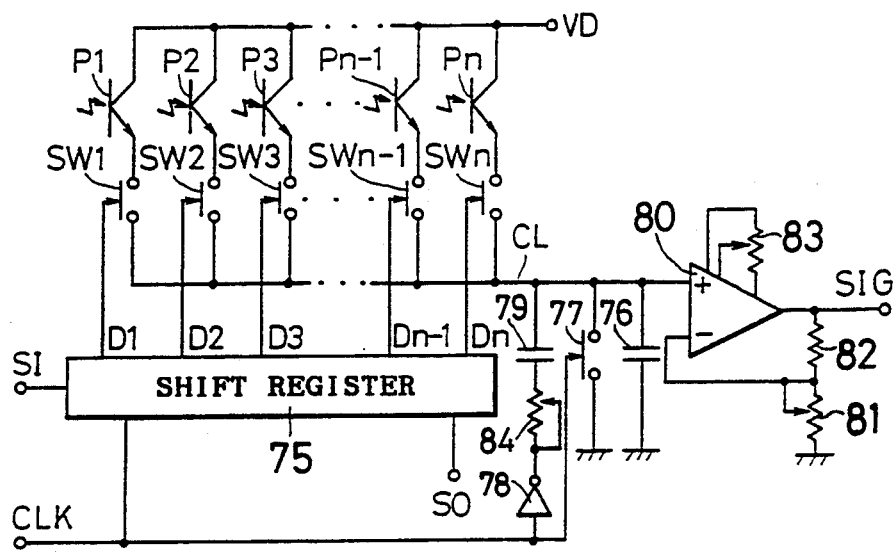
Fig.20(a) CLK 
Fig.20(b) D1 
Fig.20(c) D2 
Fig.20(d) D3 
Fig.20(e) SIG 
Fig.20(f) SIG WHEN IT IS DARK  0V ─────────────

DOCUMENT READING APPARATUS, HAVING A BODY UNIT FOR HOLDING APPARATUS COMPONENTS

BACKGROUND OF THE INVENTION

1. Field of the Invention

The present invention relates to a tight contact type document reading apparatus used for a facsimile machine, a card reader, or an image scanner used for image input to a computer.

2. Description of the Related Art

Generally, a document reading apparatus reads an image in a direction perpendicular to a moving direction as moving document relatively to the apparatus. In reading an image, conventionally a charge coupled device (CCD) with a plurality of photoelectric transducer elements arranged in one dimension was often used. The pitch of a photoelectric transducer is, for example, 7μ. The number of photoelectric transducer elements that can be installed on a CCD is approximately, 5000 at present. A pixel density required for reading a document is, for example, 16 pixels/nm. Under such a condition, an image from a document must be scaled down by an imaging optical system when it is received by a CCD.

U.S. Pat. No. 4,774,592 discloses a construction for reading an image by pixels more than the number of photoelectric transducer elements of a CCD. In FIG. 1, a plurality of convex lenses 2a, 2b are disposed at an interval with a base plate 1. CCDs 3a, 3b are mounted on the base plate 1 corresponding to the convex lenses 2a, 2b. Each convex lense 2a, 2b forms an image of a document 4 on each CCDs 3a, 3b including an overlapping portion of length ΔL. The overlapping portion is provided in order to eliminate an influence by thermal expansion of the base plate 1. The temperature of the base plate 1 is detected by a thermistor 5. Output from CCDs 3a, 3b is processed to remove the overlapping portion corresponding to the detected temperature.

A document reading apparatus using CCD has a pitch of photoelectric transducer elements considerably smaller compared with a required pixel density, so that light path necessarily becomes long (shrinkage rate becomes high) and a large form of imaging optical system is required. Long light path needs more supporting members for each parts so that it becomes difficult to design and to manufacture products resulting in an increase in cost. Long light path (high shrinkage rate) also amplifies minute deviation from optically designed arrangement. It is therefore very difficulty to control variation of manufactured parts to adjust coefficient of thermal expansion, and to compensate light axis. When a plurality of CCDs are used, influence of thermal expansion must be removed as described above. In case a single CCD is used to read along document, the light path becomes longer and the shrinkage rate becomes higher. This makes it inevitable that and power of definition become low around periphery of the lens. Therefore, lately a document reading apparatus such as a tight contact type image sensor has been actively developed without using a CCD. A typical prior art of a tight contact type image sensor is disclosed, for example, in JAPANESE LAID-OPEN PATENT 62-18166 (1987).

Such a conventional document reading apparatus is normally composed of a light source 6 consisting of a fluorescent lamp or the like, a rod lens array 2 of an erect equi-magnification optical system, and a semiconductor chip 7 having a plurality of photoelectric transducer elements 7a, 7b as shown in FIG. 2. The light source 6 projects light upon a document 4, and the reflected light is radiated upon each photoelectric transducer element 7a of the semiconductor chip 7 through the rod lens array 2. An image of the document 4 is read by causing a photoelectric transformation corresponding to the light radiated upon each photoelectric transducer element 7a.

However, in this conventional document reading apparatus, the rod lens array 2 to guide the reflected light from the document 4 upon the photoelectric transducer elements 7a, 7b on the semiconductor chip 7 has an erect equi-magnification optical system. Since the reflected light from the document 4 is radiated upon the photoelectric transducer elements 7a, 7b at an equal magnification, the photoelectric transducer elements 7a, 7b on the semiconductor 7 must be arranged in a straight line at a specified interval substantially with the same length as the document (e.g., 216 mm in the case of size A4). Accordingly, such a document reading apparatus had a defect that the photoelectric transducer elements 7a, 7b must be arranged in a very long line.

Also the semiconductor chip 7 with a long size arrangement of the photoelectric transducer elements 7a, 7b at a specified interval is very hard to manufacture by the present semiconductor manufacturing technology. Generally a nondefective semiconductor chip with a short length is cut out from a semiconductor base plate with a certain size, and a plurality of such semiconductor chips 7 with a short length are arranged in a straight line. Thereby the photoelectric transducer elements 7a, 7b are arranged substantially with the same length as that of the document 4.

However, when the nondefective semiconductor chip 7 is cut out from a semiconductor plate, the photoelectric transducer elements 7a, 7b are formed over the whole range, so that a stress during cutting out is applied to the photoelectric transducer elements 7a, 7b in the vicinity of cutting portion, thereby causing a distortion. As a result, such a document reading apparatus has a defect that precision for reading a document decreases because precise photoelectric transformation could not be made by the photoelectric transducer elements 7a, 7b.

Here, in order to solve such a defect, it may be possible to reduce the area of each photoelectric transducer element 7a, 7b formed on the semiconductor chip 7, keeping a long distance between the cutting portion of the semiconductor chip and the photoelectric transducer elements 7a, 7b in the vicinity thereof. However, when the area of each photoelectric transducer element 7a, 7b is reduced, the amount of transformation electricity at each photoelectric transduction element 7a, 7b becomes small, which leads to a defect of falling sensitivity in document reading.

SUMMARY OF THE INVENTION

It is an object of the present invention to provide a tight contact type document reading apparatus which does not require an arrangement of photoelectric transducer elements substantially with the same length as a document to be read as an image.

It is another object of the invention to provide a document reading apparatus which can control an imaging optical system in itself and to be treated as a replaceable part in a fascimile apparatus or the like.

The invention provides a document reading apparatus characterized in that it includes a light source to radiate a document, a plurality of lenses arranged in line at a predetermined interval for imaging the light reflected from the document and form a shrinked document image, and a plurality of semiconductor chips having a plurality of photoelectric transducer elements arranged in line, each chip corresponding to each lens respectively in order to receive the document image, and a body unit for holding the light source and the semiconductor chip to mutually shield light from each light path leading from the document to the corresponding semiconductor chip through each lens.

A document reading apparatus in accordance with the invention is composed of a light source, a plurality of lenses arranged in line at a predetermined interval, a plurality of semiconductor chips having a plurality of photoelectric transducer elements arranged in line corresponding respectively to each lens, and a light shielding plate situated between each semiconductor chip. The light reflected from a document is divided into a plurality of blocks by the lens as well as scaled down to be radiated on the semiconductor chip having photoelectric transducer elements. Accordingly, each semiconductor chip may be compact in its form with a short length, and each semiconductor chip need not be arranged long in line with its end in contact with each other to have substantially the same length as the document.

Also the light source, the lens, and the semiconductor chip composing an imaging optical system are held by a body unit. It enables the document reading apparatus by itself to adjust the imaging optical system, and be treated as a single part. Final products having document reading function (such as a facsimile apparatus) improve in maintainance property very much.

The light reflected from the document radiated upon the photoelectric transducer element formed on each semiconductor chip is scaled down by the lens, so that the amount of transformation electricity can be made large even when the area of the photoelectric transducer element is made small. As a result, sensitivity in the document reading can be kept high.

Further, in providing a semiconductor chip having a multiplicity of photoelectric transducer elements thereon by cutting a semiconductor base plate with the area of a photoelectric transducer element reduced, the distance between a cutting portion and a photoelectric transducer element in the vicinity thereof can be made long. As a result, there is hardly a case where a stress in cutting is applied to a photoelectric transducer element in the vicinity of the cutting portion to generate distortion. It also enables all the photoelectric transducer elements to perform a correct photoelectric transformation, remarkably improving a document reading precision.

Further, light paths for leading light to the respective semiconductor chip are mutually shielded, so that it can be effectively prevented that unnecessary light is radiated on each semiconductor chip causing unnecessary photoelectric transformation by a photoelectric transducer element formed on the semiconductor chip. It enables a photoelectric transducer element of each semiconductor chip to perform a correct photoelectric transformation corresponding to image information of a document.

Furthermore, a document reading apparatus in accordance with the invention does not employ expensive rod lens array, so that it makes the whole apparatus inexpensive.

In accordance with the invention, a light source includes a plurality of light-emitting elements arranged in parallel to an arrangement direction of lenses, each light-emitting element being arranged between two adjacent lenses and positioned at an equal distance from each lens.

When a light-emitting element is provided between adjacent lenses and positioned at an equal distance from each lens, the light reflected from a portion of a document corresponds to a portion with a large amount of light from the light source enters the lens at a large incident angle. The amount of transmitted light necessarily decreases on the periphery of a lens in comparison with the center of the lens, (this phenomenon is called as peripheral extinction). Since the light source is placed on the periphery, which is likely to be dark in comparison with the center, the photoelectric transducer elements are radiated by equal light. The incident angle of the light reflected from a portion with a small amount of light is small. Such a compensating function allows a substantially uniform light to be radiated upon a semiconductor chip.

Also in accordance with the invention, semiconductor chips, placed upon a circuit wiring base plate, being held by the body unit, so that allowing a coefficient of linear expansion of the circuit wiring base plate to be substantially equal to that of the body unit.

In a document reading apparatus in accordance with the invention, a circuit wiring base plate on which semiconductor chips are placed and a body unit for supporting lenses have substantially the same coefficient of linear expansion.

When the document reading apparatus is heated to a high temperature, the circuit wiring base plate and the body unit thermally expand at substantially equalrate. It eliminates discrepancy to be caused between the semiconductor chip placed on the circuit wiring base plate and the lens supported by the body unit, which results in a correct document reading.

Also in accordance with the invention, electric insulation material of the circuit wiring base plate is selected from a group consisting of reinforced glass fiber epoxy resin, paper phenol resin, or paper epoxy resin, and a reinforcing plate made of metal or plastic being fixed to the rear side of the circuit wiring base plate, on the front side of which the semiconductor chips being arranged.

Since the reinforcing plate made of metal or plastic is fixed to the rear side of semiconductor chip array face of the circuit wiring base plate, the circuit wiring base plate is hard to generate a deflection when it is touched. Also when the semiconductor chips are die attached using die attach paste such as epoxy resin or silver paste, the paste is heated to form 100° to 150° C. for hardening, where an accompanying deflection of the circuit wiring base plate can be prevented by the reinforcing plate. It leads to a higher manufacture yield, improved manufacture efficiency, and reduced product cost, as well as enables provision of a document reading apparatus with a high performance and reliability.

Also in accordance with the invention, each semiconductor chip and the circuit wiring base plate has a light transparent resin layer with thickness below approximately 100 $\mu$m, formed on both surface. The surface of the light transparent resin layer formed on each semiconductor chip is flat, so that an optical defect to cause deterioration of an image quality is very small.

Further, according to the invention, an angle $\eta$ satisfies a condition $\eta > 90°$, the angle $\eta$ being defined between a first straight line joining an object point of a focusing system formed for each lens and a luminescent point of the light source, and a second straight line joining an intersection of a straight line passing through the object point and an object principle point of the focusing system and a first plane including the luminescent point of the light source and the luminescent point.

In accordance with the invention, when a light source such as a light-emitting diode (LED) radiates a document, a recess of distribution of light intensity occurring in normal direction of light emitting face of the light source can be avoided. It enables prevention of fluctuation of lighting amount resulting from an installation error of the light source. Accordingly, the quality of an image read out is improved. Installation precision of the light source can be loosened in manufacturing of a document reading apparatus, thereby a production cost can be reduced. Also an effective lighting intensity on a document reading face is improved than before, so that the amount of light reaching a light receiving element is increased, which leads to improvement of an image quality such as S/N ratio, black/white ratio (contrast ratio), and color ratio.

Also in accordance with the invention, an angle $\phi$ formed by a first plane including a light emitting face of a light source, and a second plane perpendicular to a line through an object point and an object principle point of the imaging optical system is conditioned by $\phi \geq 45°$.

It enables a direction of the light source to be optimum and occupied space of an optical system to be reduced, so that the whole reading apparatus can be madecompact and light. In addition, no optical system for correcting distribution of light quantity is required, and the production cost can be further reduced.

Also in accordance with the invention, there are formed protrusion portions or stage difference portions on a sidewall facing a light path from the document to the lens of an inner face of a body unit.

There are thus formed more than one protrusion portions on the sidewall facing a light path from the document to the lens of an inner face of the body unit, thereby reducing stray light entering the lens. Instead of such protrusion portions, there can be formed more than one stage difference portions by which an interval of the inner face of a body unit becomes smaller sequentially from the document to the lens, thereby reducing stray light entering the lens. Further, since the stray light entering the lens is reduced, image quality of a reading signal output by a semiconductor chip can be improved, such as S/N ratio, white/black ratio (contrast ratio), and uniformity in black level.

Further in accordance with the invention, a sidewall facing a light path from the document to the lens of the inner face of a body unit is blackened and matted.

Since a sidewall facing a light path from the document to the lens of the inner face of a body unit is blackened and matted, generation of reflected light or scattered light by the light upon the inner face of a body unit can be restrained.

Further in accordance with the invention, on the inner face of a body unit, means for shielding light to enter directly from the light source to the lens, being formed.

Such light shielding means is formed, thereby an influence by stray light with rather great light intensity emitted from a light source can be restrained. Further, stray light is reduced entering a portion other than a photoelectric transducer element such as a transistor formed on the semiconductor chip, so that occurrence of abnormal operation of a control circuit or the like can be avoided.

Further in accordance with the invention, a plurality of lenses are formed of transparent highpolymer material, and the body unit is formed of highpolymer material, the both being adhesively fixed by ultrasonic welding.

Since the lenses are fixed without the use of adhesive, there is hardly a case where the adhesive flows onto a lens face to interrupt a light path, thereby deteriorating reading performance. Also, there is hardly a case where a low molecular monomer discharged thereby sticks to a lens face, or the adhesive flies about and adheres to a lens face, thereby interrupting a light path and deteriorating reading performance.

Further, in the case where some dirt is biten between the bottom of a lens and a body unit, such dirt is wrapped in highpolymer by ultrasonic welding, so that there is no deterioration of reading performance resulting from the dirt. Further, in accordance with a conventional method using adhesive, hardening and contraction of the adhesive generate a stress on the lens, thereby deteriorating a spherical or non-spherical form precision of the lens. It follows that a correct reading with a high precision is disabled. In accordance with the invention, such a problem can be solved, as well as a problem of troublesome control of adhesive itself resulting from the use thereof.

Also in accordance with the invention, each semiconductor chip scans each photoelectric transducer element sequentially since when a scan start signal is input, and when scanning is finished, a scan completion signal is output, as well as a terminal to output the scan completion signal is formed closer to the side of scan start of a photoelectric transducer element than a terminal to which the scan start signal is input.

In accordance with the invention, each semiconductor chip to receive a document image scans each photoelectric element sequentially since when a scan start signal is input, and outputs a scan completion signal when scan is completed. A terminal to output the scan completion signal is formed closer to the side of scan start than a terminal to which the scan start signal is input. It allows a simpler wiring pattern for electrically connecting adjacent semiconductor chips each other. Further, it enables an easier design and manufacture of a circuit base plate, reducing crosstalk between wiring patterns and improving S/N ratio of a read signal.

Also a document reading apparatus in accordance with the invention includes a common signal line commonly connecting output from each photoelectric element, a plurality of switching elements intervening between each photoelectric transducer element and the common signal line, a scan circuit for sequentially driving each switching element, and means for applying to the common signal line a signal of a phase opposite to that of a noise signal superimposed upon the common signal line. Connecting the opposite phase signal applying means for applying a signal of a phase opposite to that of a noise signal superimposed upon the common signal line allows a noise signal and an opposite phase signal to be canceled each other, thereby reducing a crosstalk noise to a read signal conducting through the common signal line. Therefore, a read signal with a low noise and a very good S/N ratio can be obtained, thereby providing an image signal with a high quality. In addition, since a measure for noise can be taken in a simple circuit, a high density wiring or a multilayer wiring for preventing a crosstalk noise is not required, whereby a rise of manufacturing cost is restrained.

Also a body unit in accordance with the invention is integratedly provided with a pedestal for installing a circuit wiring base plate and a light shielding member for partitioning each lens, and when a focus distance of the lens is f, height of the light shielding member can be formed low in a range of f/40 or below with respect to an edge face of the pedestal.

Thereby, when a foreign matter with a height up to 5/40×2 should exist on an edge face of the light shielding member, relative displacement between a semiconductor chip and a lens is within a permitted range. Accordingly, an assembly precision of a circuit base plate is loosened, thereby improving a yield in manufacturing a reading apparatus.

Also a body unit in accordance with the invention is provided with a light transmitting plate to hold a document transported, and has document guides on both sides in transport direction of the light emitting plate, and a sectional form of at least one of the document guides along a transport direction of the document has an inclined portion on the transparent plate side, and an inclination angle of the inclined portion is 45° or below with respect to a document travel face of the light transmitting plate.

When a document travels on a travel face of the light transmitting plate in a specified direction, a bite of a document edge or a jam of documents can be avoided, thereby enabling a smooth transport of documents. Especially, in the case of a bidirectional feed where scan (reading) is made by moving a document back and forth, a smooth document transport is ensured as well.

Also the invention provides a document reading apparatus characterized in that it includes a light emitting plate in contact with a document, a light source to radiate the document, a plurality of lenses arranged in line at a specified interval for imaging reflected light from the document to form a scaled-down document image, a plurality of semiconductor chips having a multiplicity of photoelectric transducer elements arranged in line corresponding respectively to each lens for receiving the document image, a circuit wiring base plate to bear the semiconductor chips, a body unit to hold the light transmitting plate, the light source, the lens, and the circuit wiring base plate.

In accordance with the invention, a document image can be scaled down to be formed by a plurality of lenses, and received by a plurality of semiconductor chips corresponding to each lens. Since a document image is scaled down in formation, it is not necessary to arrange photoelectric transducer elements continuously between adjacent semiconductor chips. Accordingly, there can be kept a clearance between smiconductor chips, and it is not necessary to arrange photoelectric transducer elements substantially with the same length as a document, whereby a document reading apparatus which can be treated as a part is constructed.

BRIEF DESCRIPTION OF THE DRAWINGS

Other and further objects, features, and advantages of the invention will be more explicit from the following detailed description taken with reference to the drawings wherein:

FIGS. 6a, 6b, and 6c are respectively a plan view, a front view, and a bottom view of the document reading apparatus shown in FIG. 3.

FIG. 19 is an electric circuit diagram showing an example of electric construction of a document reading apparatus pertaining to the invention.

FIG. 20a to FIG. 20f are timing charts showing an operation of the electric circuit shown in FIG. 19.

DETAILED DESCRIPTION OF THE PREFERRED EMBODIMENTS

Figure 1:
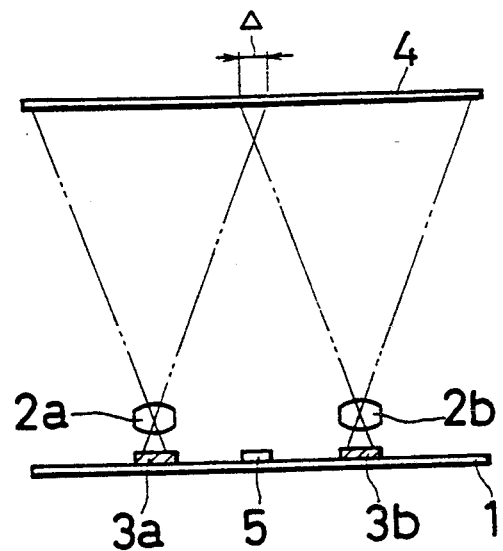
FIG. 1 is a sectional view showing a basic construction of a prior art.
Figure 2:
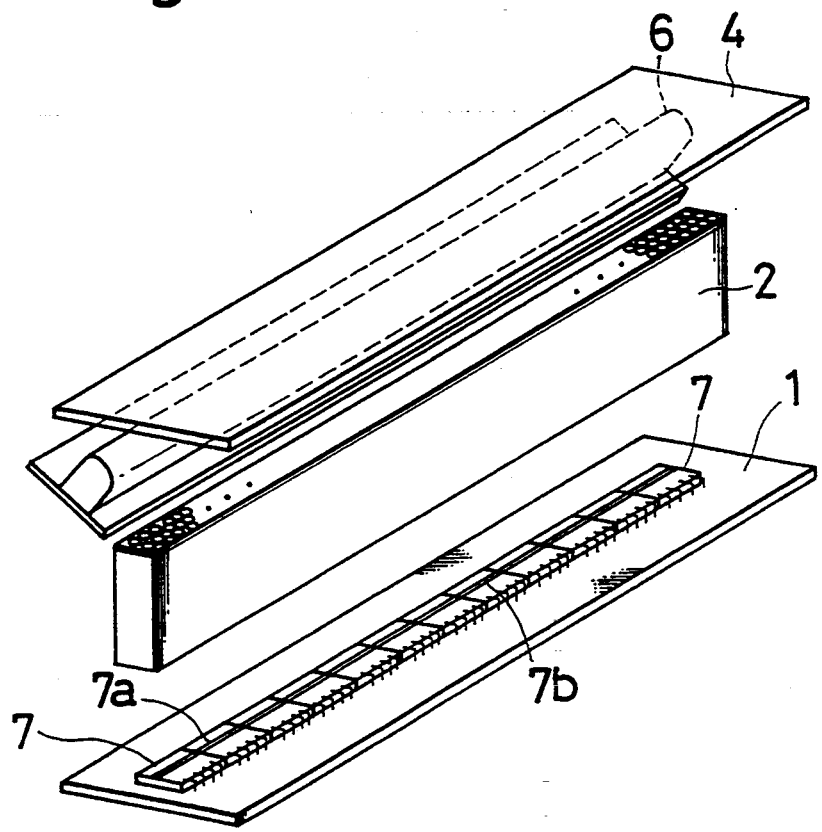
FIG. 2 is a perspective view showing a construction of another prior art.

Now referring to the drawing, preferred embodiments of the invention are described below.

An embodiment of the invention will now be described with reference to the accompanying drawings.

Figure 3:
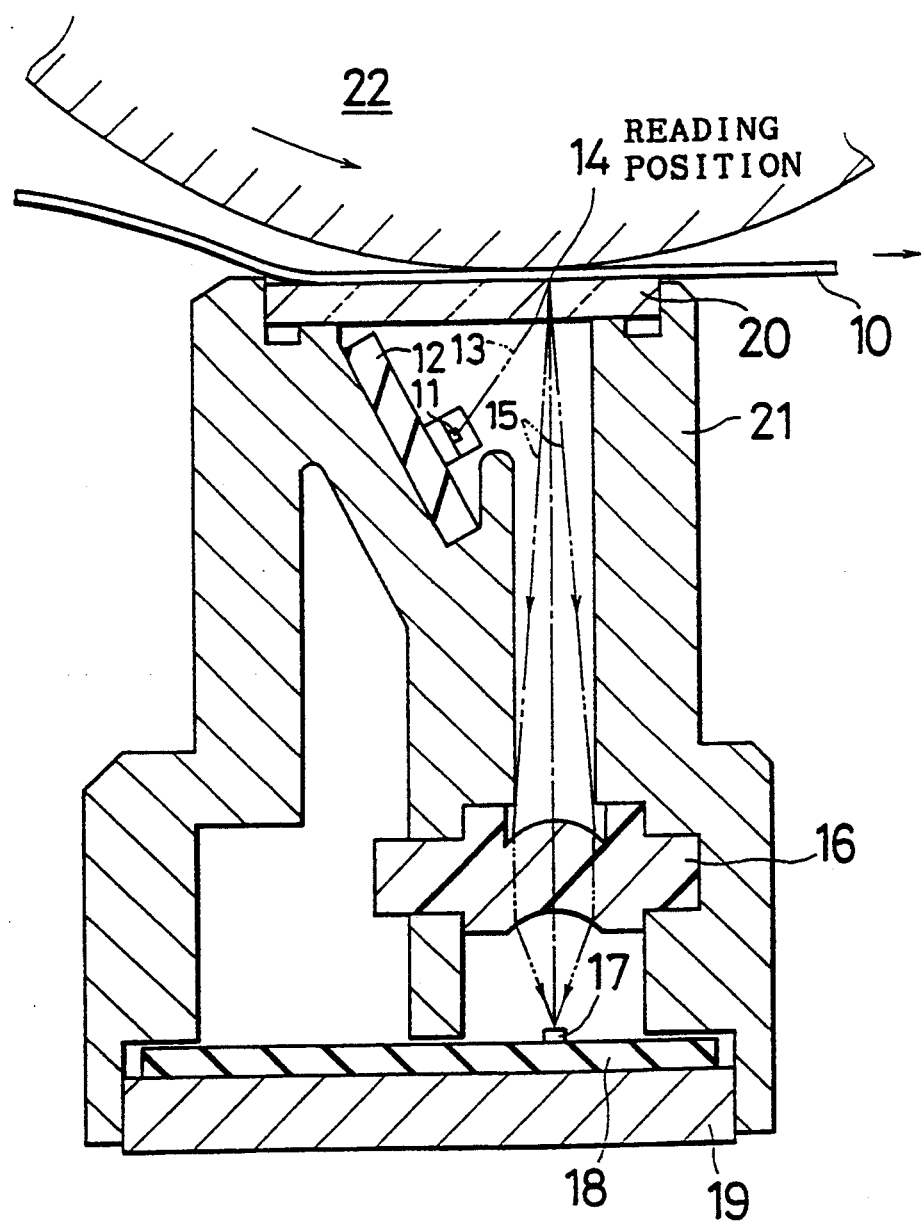
FIG. 3 is a sectional view showing a document reading apparatus in accordance with an embodiment of the present invention.

FIG. 3 shows a document reading apparatus by an embodiment of the invention. The document reading apparatus is composed of a plurality of light sources 11 such as LED (Light Emitting Diode) arranged in line, a plurality of lenses 16 arranged in line at a specified interval, a semiconductor chip 17 which is a light receiving element having a multiplicity of photoelectric transducer elements arranged in line corresponding to each of the lenses 16 respectively, and a body unit 21 holding the light sources 11 and the lenses 16, or the like.

A document 10 is transported in secondary scanning direction at a constant speed by rotation of a feed roller 22, being in contact with a transparent light transmission plate 20 consisting of glass or acrylic resin. In combination with this operation, the light sources 11 fixed to a base plate 12, emitting light 13, light the document 10 through the light transmitting plate 20 obliquely aslant, reflected light 15 from a reading position 14 of the document 10 enters the lenses 16 again through the light transmitting plate 20, and a document image divided into some blocks is formed. The lenses 16 are formed into spherical lenses or non-spherical lenses integrated with a lens frame by injection molding of resin, those with a focus distance approximately 3.429 mm being preferably employed. An imaging magnification M corresponding to a form of a light receiving face of the semiconductor chip 17 can be selected by adjusting level of the lenses 16. Also, in order to interrupt stray light between adjacent blocks, light is shielded between each semiconductor chip 17.

The semiconductor chip 17 fixed to a circuit base plate 18 on a bottom plate 19 receives light from each document image, and outputs a reading signal corresponding to the document. The semiconductor chip 17 has a multiplicity of photoelectric transducer elements formed on a semiconductor base plate such as single crystal silicon by well-known photo-lithography technology or ion beam processing, and is wire-bonded to a conductor pattern formed on the circuit base plate 18 consisting of glass epoxy resin or the like, together with various circuit parts.

The body unit 21 consists of metal such as alminium, or resin such as glass fiber reinforced acrylic nitril-butadiene-styrene mixed polymer (ABS resin), glass fiber reinforced plastic, and polycarbonate containing glass filler. The body unit 21, having a hollow construction to allow reding light to pass and shield outside light, is formed longitudinally along a width direction (primary scanning direction) of the document 10. An inclined face formed inside the body unit 21 holds the light sources 11 and the base plate 12. An imaging magnification according to a form of a light receiving face of the semiconductor chip 17 is selected by adjusting a position of the lenses16.

Figure 4:
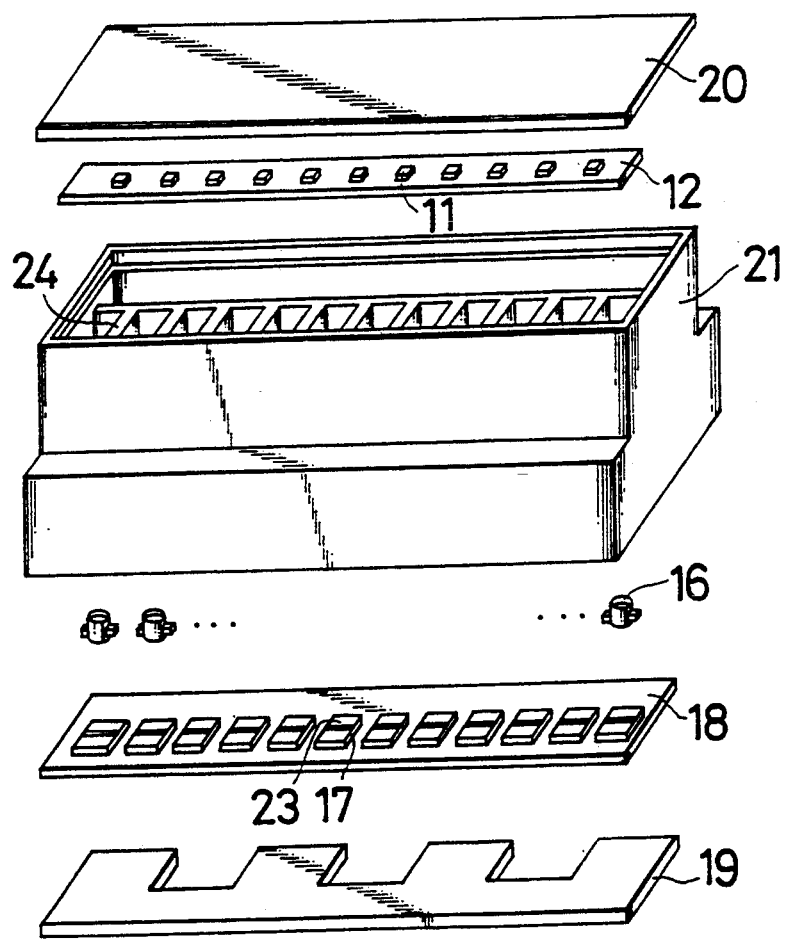
FIG. 4 is an exploded perspective view of the document reading apparatus shown in FIG. 3.
Figure 5:
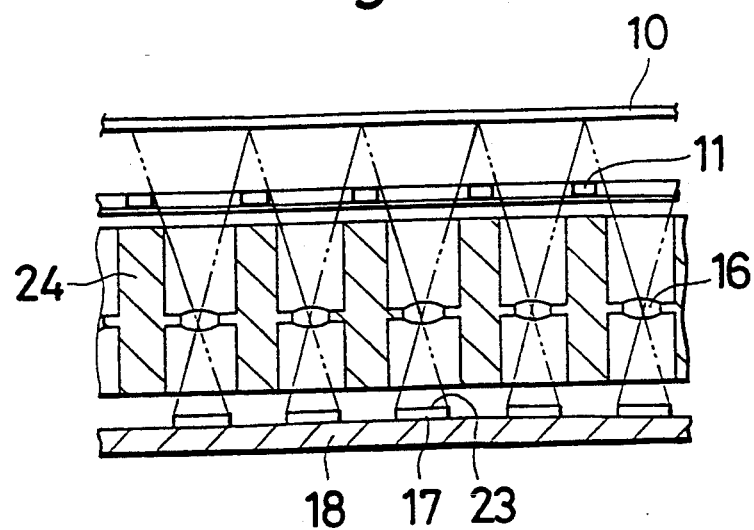
FIG. 5 is a partially sectional view of the document reading apparatus shown in FIG. 3 along its optical axis.

FIG. 4 is an exploded perspective view of the document reading apparatus shown in FIG. 3, and FIG. 5 is a partially sectional view along its optical axis. The document reading apparatus consists of light sources 11 such as LEDs (Light Emitting Diode) or fluorescent lamps for lighting a document 10, a plurality of lenses 16 arranged in line at a specified interval for imaging reflected light from the document 10 to form a document image, a plurality of semiconductor chips 17 having a light receiving face 23 consisting of a multiplicity of photoelectric transducer elements arranged in line corresponding to each lens 16 respectively in order to receive light from the document image, a circuit base plate 18 to which the semiconductor chip 17 is fixed, and a body unit in which the lenses 16 and the circuit base plate 18 is fixed to the light source 11, or the like.

Light emitted from the light source 11 lights the document 10 obliquely aslant. Light reflected from the document 10 is imaged by each lens 16 for each of plurality of blocks. A reading signal corresponding to image information of the document 10 is output time-serially by sequential scanning of a plurality of photoelectric transducer elements provided for the semiconductor chip 17 corresponding to each block. The body unit 21 is provided with a light shielding member 24 between each lens 11 in order to prevent stray light or disturbance light.

FIG. 6 shows a form of the body unit 21, where FIG. 6a is a plan view seen from a document face side, FIG. 6b is a front view, and FIG. 6c is a bottom view seen from a circuit base plate side.

The body unit 21 is provided with an inclined face 24 to which the light source 11 is mounted along its longitudinal direction seen from the document side, where arranged in line at a specified interval are a plurality of lenses 16 for imaging light reflected from the document 10. Also there is formed a light shielding member 24 between each lens 16. When seen from the circuit base plate side, a pedestal 32 to which a circuit base plate 18 is mounted is formed at a specified interval, further a convex protrusion 33 is formed near the center of the pedestal 32. In addition, a light trasmitting aperture 31 also serving as a stop is formed on the circuit base plate side of each lens 16 installed.

Figure 7:
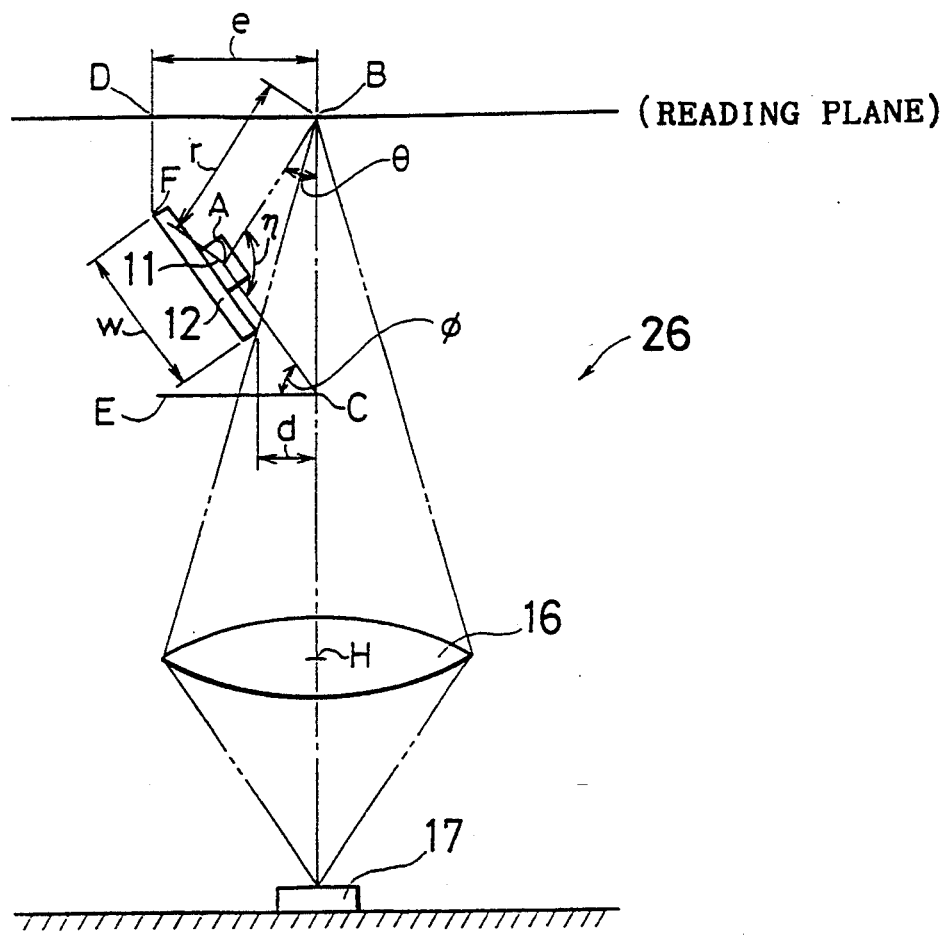
FIG. 7 is a schematic side view showing an optical system of the document reading apparatus shown in FIG. 3.

FIG. 7 is a schematic side view showing the optical system of the document reading apparatus of an embodiment shown in FIG. 3. A luminescent point of a light source 11 including a light emitting diode is assumed A; an object point of a focusing system 26 which is a part to read a document image is B; an object principle point of the focusing system 26 is H; and an intersection of a first plane including a luminescent plane of the light source 11 and a straight line passing through the object point B and the object principle point H is assumed C. A point on a reading face defined by a perpendicular line extending from an end F of the substrate 12 on which the light source 11 is fixed is assumed D. An intersection of a second plane which is normal to a straight line BH and passes through the point C and an extension of a straight line DF is assumed E. Further, a distance between the luminescent point A and the object point B is r. A width of the substrate 12 on which the light source 11 is fixed is assumed w. A distance between one end of the substrate 12 and an optical axis is assumed d, and a distance between the other end of the substrate 12 and the optical axis is assumed e. Further, $\angle BAC$ is assumed as an angle $\eta$; $\angle ABC$ as an angle $\theta$; and $\angle ACE$ as an angle $\phi$. It will be noted that a relationship; $\eta + \theta = 90°$, is obtained based on the principle of trigonometry.

Figure 8:
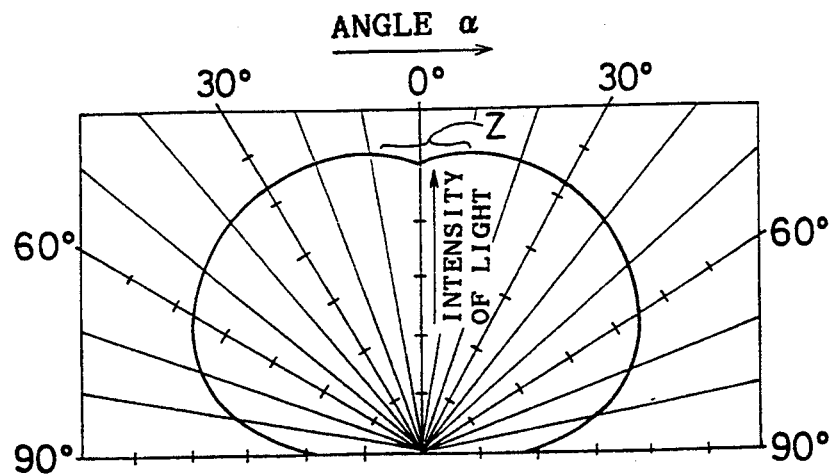
FIG. 8 is a graph showing distribution of light emitting intensity of a general light emitting diode.

FIG. 8 shows a distribution of light emitting intensity of a general LED used as the light source 11. In such an optical system, the angle $\eta$ is conditioned by $\eta > 90°$, whereby the reading face can be lighted avoiding a recess Z of distribution of light intensity generated in a direction normal to light emitting face shown in FIG. 8. Especially, the angle $\eta$ should preferably be conditioned by $100° \leq \eta \leq 130°$, which is equivalent to lighting a reading face with a light intensity when an angle α in FIG. 8 is in a range from 10° to 40°, thereby improving an effective lighting intensity at the object point B as well as lessening a flutcuation of lighting amount due to installation error of an LED's direction (manufacturing variation).

In addition, since the angle $\phi$ can be adjusted independent of the angle $\theta$ and the angle $\eta$, when a condition $\phi \geq 45°$ is provided, the length of $e = d + w \times \cos \phi$ which means a size of optical system can be reduced, thereby decreasing a space occupied by the whole optical system.

Figure 9:
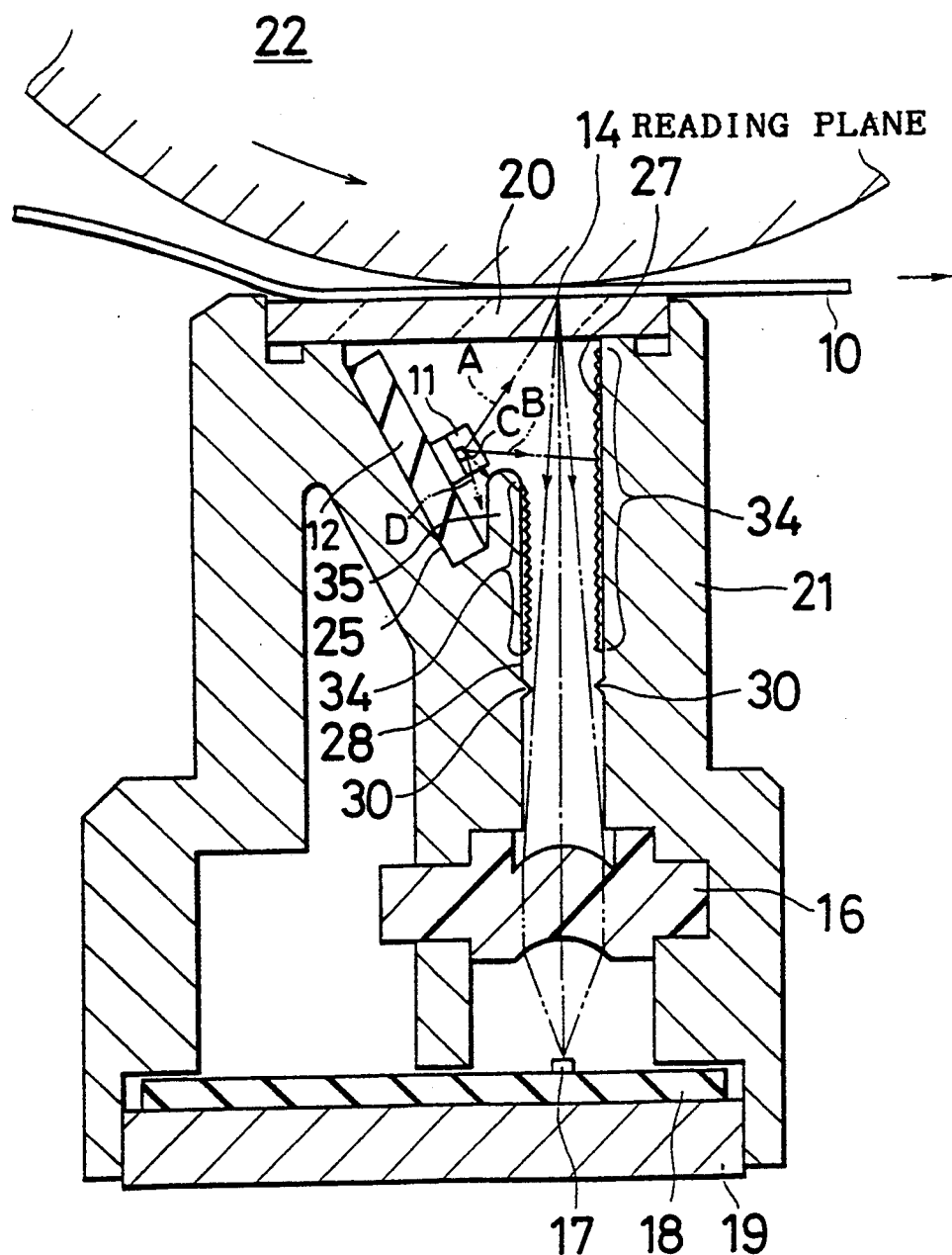
FIG. 9 is a sectional view showing a document reading apparatus by another embodiment of the invention.

FIG. 9 shows a construction of a document reading apparatus by another embodiment of the invention. The portions corresponding to an embodiment shown in FIG. 3 are provided with the same reference notations.

Figure 10:
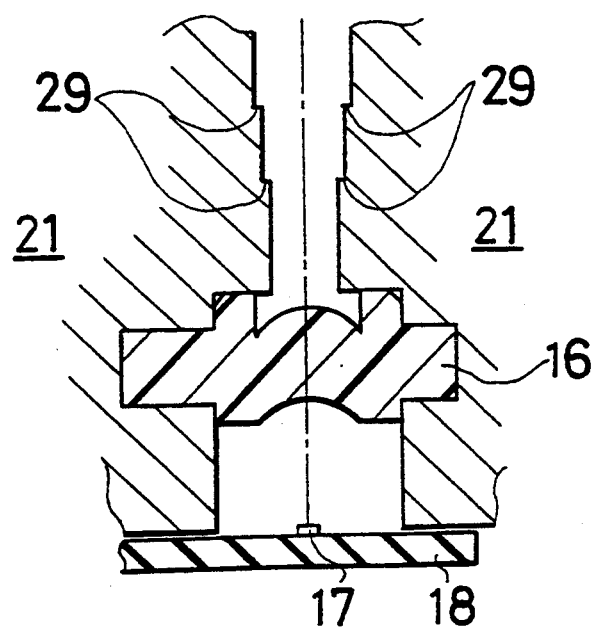
FIG. 10 is a partial sectional view of an optical system of a document reading apparatus by still another embodiment of the invention.

Protrusion portions and stage difference portions formed inside the body unit 21 will be described hereafter. Side walls 27 and 28 facing a light path from the document 10 to the lens 16 are provided with a protrusion 30 with a specified height within a range where the light is not interrupted from the reading position 14 to an entrance pupil or an open stop of the lens 16. A contour form of the protrusion 30 seen along an optical axis direction may be formed either like a slit parallel with a longitudinal direction of the body unit 21 or as a plurality of circles corresponding respectively to each lens 16. Such a protrusion 30 can prevent a part of scattered light generated on the side walls 27, 28 from entering the lens 16. In FIG. 9, an example is shown where the protrusion 30 is formed in one position, while a plurality of protrusions with different heights and positions may be formed within a scattered light generated on the side walls 27 and 28 from entering the lens 16. In FIG. 9, an example is shown where the protrusion 30 is formed in one position, while a plurality of protrusions with different heights and positions may be formed within a range where reading light is not interrupted. Further, instead of forming such a protrusion 30, a plurality of stage difference portions may be formed where a space inside the box unit becomes sequentially smaller along with advance from the document 10 to the lens 16 as shown in a partially sectional view of FIG. 10, and such a stage difference 29 can also serve to interrupt a part of scattered light generated on the side walls 27 and 28. The stage difference 29 may be formed facing against the light source 11 only on the side wall 27 where the intensity of stray light becomes large.

Next described will be blackening process 34 and matting process applied to an inner face of the box unit 21. The side walls 27 and 28 facing a light path from the document 10 to the lens 16 are treated with blackening process 34 such as application of black paint, ionized filling, attachment of filling paper, formation of black alminium oxide film used when the box unit 21 consists of alminium, mixing of black pigment used when the box unit 21 consists of resin. Further, if any luster should remain after such blackening process, matting process such grinding and etching is applied, whereby most of the light B radiated upon the sidewalls 27, 28 is absorbed. Accordingly, the intensity of scattered light generated on the sidewalls 27, 28 is remarkably reduced, thereby as restraining stray light entering the lens 16. In FIG. 9, an example is shown where blackening process 34 and matting process are applied only to the side walls 27, 28, while they may be applied all over the inner face and the outer surface of the body unit 21.

Next described will be means for shielding light entering the lens 16 directly from the light source 11. There is provided a light shielding means 35 with its convex section composing a part of the body unit 21 between the light source 11 and the lens 16. Light C, D from the light source 11 strikes on the light shielding means 35, which prevents direct light or scattered light due to the light C, D from entering the lens 16.

Figure 11:
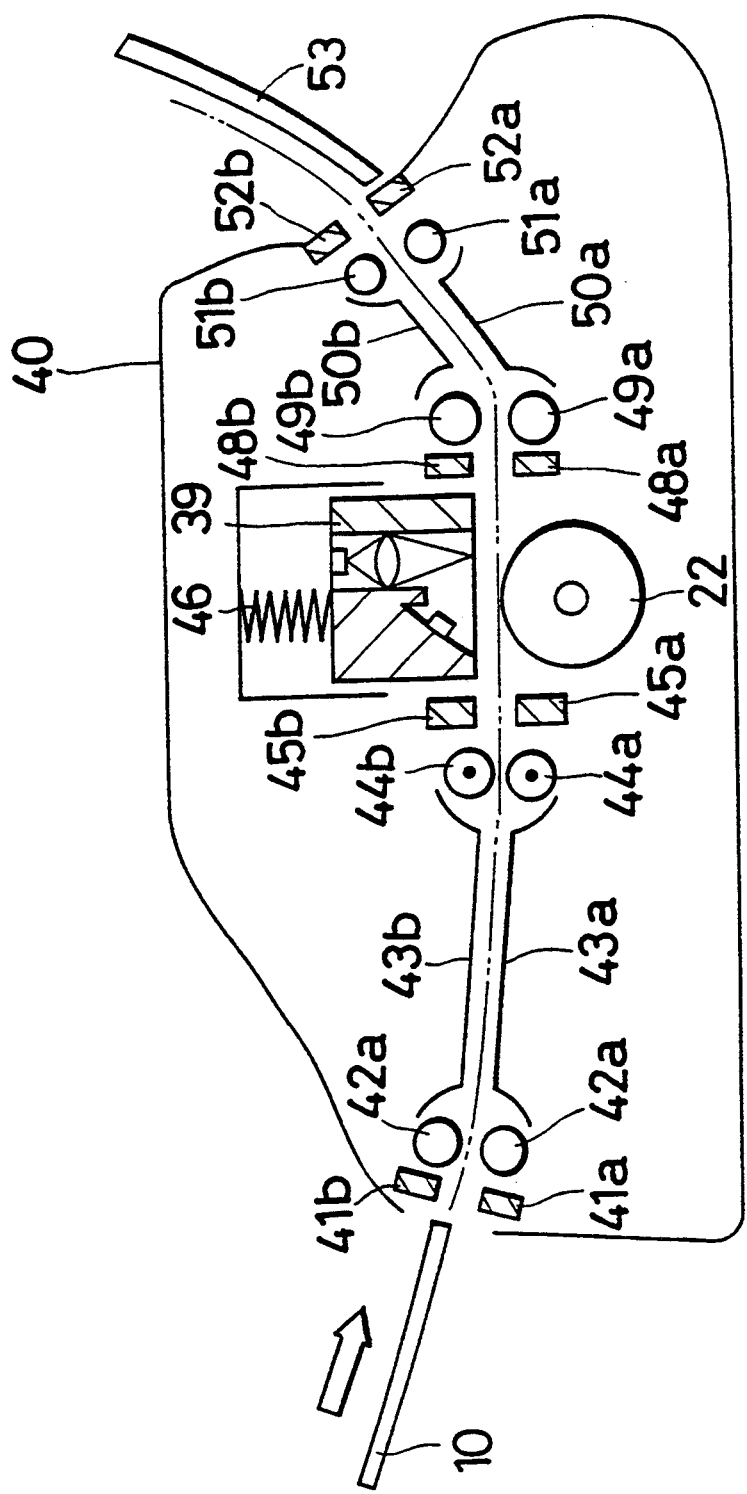
FIG. 11 is a construction view showing a document transport mechanism of a facsimile apparatus using a document reading apparatus pertaining to the invention.

FIG. 11 is a schematic construction view showing a document transport mechanism of a facsimile using a document reading apparatus pertaining to the invention.

When a document 10 is inserted through an opening of a facsimile body 40, an optical sensor consisting of an LED 41a and a PT (Photo Transistor) 41b detects the document 10, and transport rollers 42a, 42b, 44a, 44b rotate, thereby feeding the document 10 along transport guides 43a and 43b until an optical sensor consisting of an LED45a and a PT45b detects the document 10.

When a tip of the document 10 reaches a feed roller 22, and a rear end of the document passes the optical sensor consisting of the LED45a and the PT45b, then the feed roller 22 rotates, and a reading apparatus 39 activated by a spring 46 starts reading being in contact with the document 10.

When an optical sensor consisting of an LED48a and a PT48b detects the document 10, transport rollers 49a, 49b, 51a, 51b rotate, thereby feeding the document 10 along transport guides 50a, 50b, 53 until it passes an optical sensor consisting of an LED52a and PT52b.

On the contrary, when the document 10 is transported in a direction opposite to the description above, rotation direction of the feed roller 22 is reversed, as well as the order of control of the optical sensors and transport rollers in the vicinity.

In the above construction, a contact type sensor such as a micro switch may be used instead of a non-contact type sensor such as an optical sensor.

Next described will be document guides 55 and 56 formed on both sides of a light transmitting plate 20.

Figure 12:
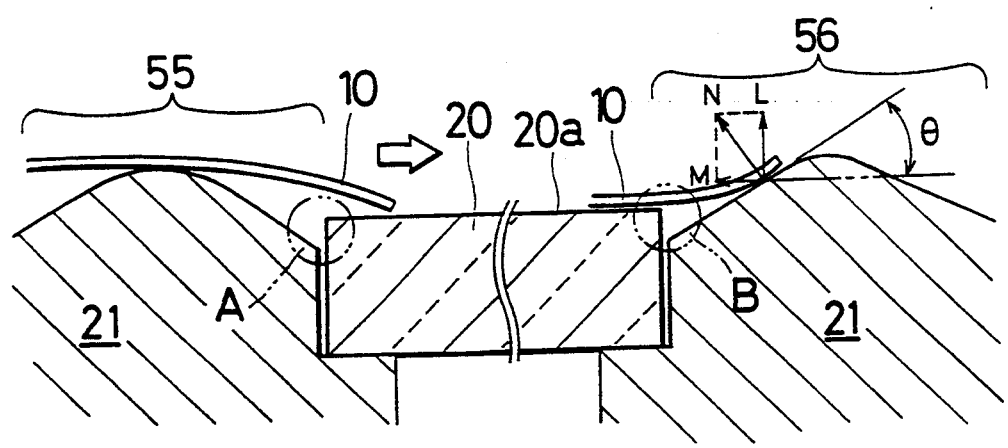
FIG. 12 is a partial sectional view showing contact of a document reading apparatus and a document.

FIG. 12 is a partially sectional view showing contact of a document 10 with document guides 55, 56. Let us assume that a friction coefficient between the document 10 and the document guides 55, 56 is so small as to be ignored. Tilt angle of the document guide 56 downstream is referred to as $\theta$, and vertical drag which the document 10 receives from the surface of the document guide 56 is referred to as N. Component M to return the document 10 is shown by $N \cos \theta$, and component L to push up the document 10 is shown by $N \sin \theta$. When the tilt angle $\theta$ is below the vicinity of 90°, $L = N \sin \theta > 0$ holds true, and the document 10 can be pushed upward, while the component M to return the document 10 comes close to the vertical drag N then, so that the document 10 buckles causing a document clogging.

Therefore, in order to satisfy a condition where the component L is not less than the component M, i.e., $N \sin \theta \geq N \cos \theta$, the tilt angle $\theta$ must be 45° or below. When the friction coefficient between the document 10 and the document guide 56 is so large as not to be ignored, the tilt angle $\theta$ should preferably be smaller than 45°.

As shown in the partially sectional view, the form of a section of the document guides 55, 56 along a document travel direction is formed convexly high at the center having inclined portions on its both sides.

In regions A and B circled by a two-dot chain line, level of the document guides 55, 56 in the vicinity of the light transmitting plate 20 is formed lower than level of the document travel face 20a of the light transmitting plate 20. On the other hand, level of the center of the document guides 55, 56 is formed higher than level of the document guides 55, 56. When the light transmitting plate 20 with a thickness varying in every piece is used, each level is determined to satisfy these conditions. Difference in level between the highest portion of the document guides 55, 56 and the document travel face 20a should preferably be formed below 2 mm approximately.

In forward feeding where the document 10 is transported from the document guide 55 to the light transmitting plate 20, the document 10 enters the document guide 55 nearly horizontally. A portion of the document 10 forward of a contact point at the center draws a deflection curve determined by a dead load and rigidity of the document 10. Therefore, difference in level between the vicinity of the light transmitting plate of the document guides 55, 56 and the document travel face 20a is determined so that deflection of the document 10 does not allow a front end of the document 10 to touch an end surface of the light transmitting plate 20.

A front end of the document 10 passing the region A, continuously being fed forward, enters the region B. In the region B, the vicinity of the light transmitting plate of the document guide 56 is formed lower than the document travel face 20 the same as described above, so that the front end of the document 10 can smoothly pass the region B. Further, since the inclined portion of the document guide 56 on the light transmitting plate side is formed at an angle of 45° or below with respect to the document travel face 20a, the front end of the document 10 can smoothly travel without being biten.

On the other hand, also in backward feeding where the document 10 is transported from the document guide 56 to the light transmitting plate 20, the document 10 enters the document guide 56 nearly horizontally, and a portion forward of a contact point at the center draws a deflection curve determined by a dead load and rigidity of the document 10, and difference in level between the vicinity of the light transmitting plate of the document guide 56 and the document travel face 20a is determined so that a front end of the document 10 (in bacward feeding, opposite to a front end in forward feeding) does not touch an end surface of the light transmitting plate 20.

When the document 10 is fed backward continuously to reach the region A, since the inclined portion of the documet guide 55 on the light transmitting plate side is formed at an angle of 45° or below with respect to the document travel face 20a the same as described above, the front end of the document 10 can smoothly travel without being biten.

In addition, in a construction where a section of the document guides 55, 56 is formed flat at the center, a smooth document transport in both forward and backward direction is also ensured the same as described above. Further, in a construction where a section of the document guides 55, 56 is formed in a circular arc having a specified curvature, a document can be smoothly transported in both directions the same as described above.

Figure 13:
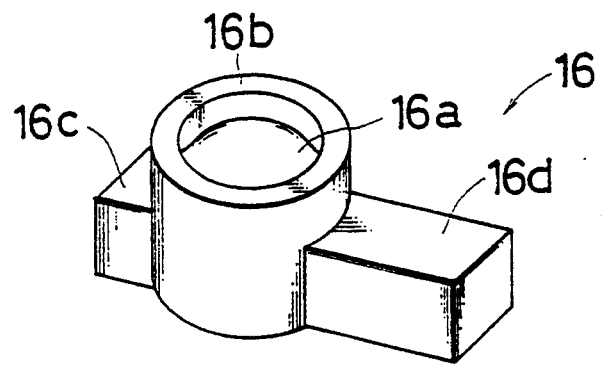
FIG. 13 is a perspective view showing an example of a lens used in a document reading apparatus pertaining to the invention.

As shown in FIG. 13, a lens 16 is almost columnar in its main portion, and both faces at the center form a convex lens 16a with convex faces. Periphery of the convex lens 16a forms a collar 16b. Further the columnar body is provided with protrusions 16c, 16d symmetrically. The protrusions 16c, 16d are to fit in a groove formed in a body unit 21.

Figure 14:
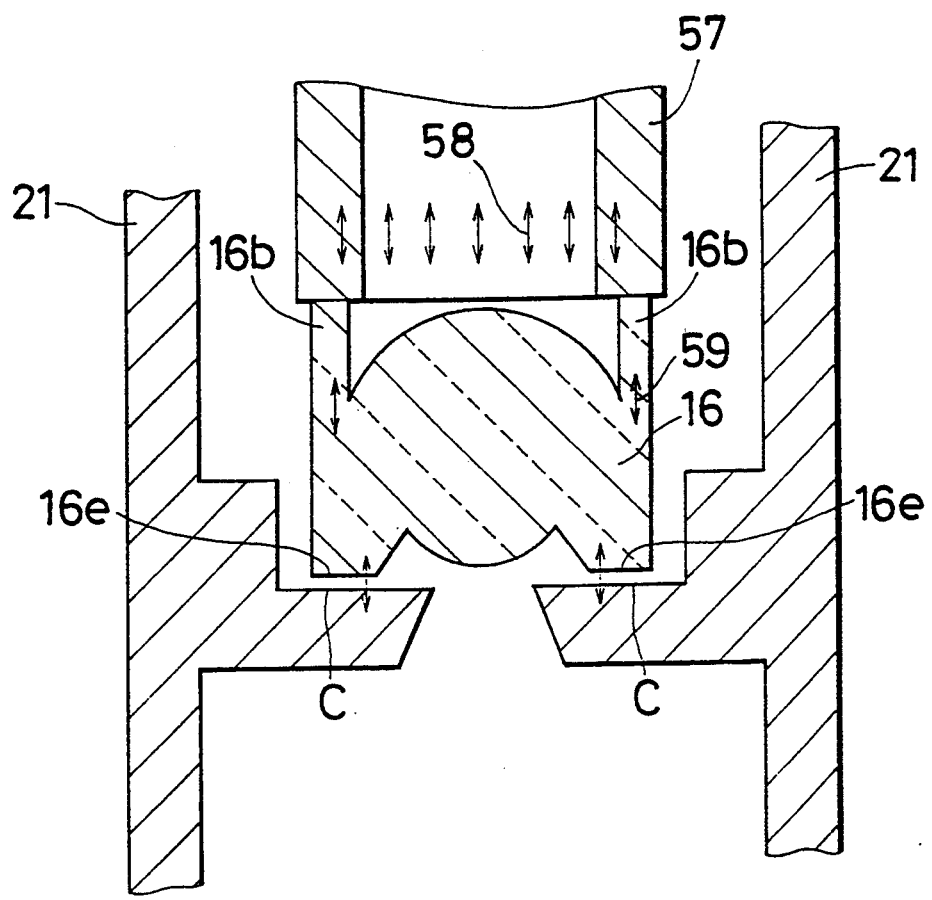
FIG. 14 is sectional view showing a situation where the lens shown in FIG. 13 is ultrasonicly welded to a body unit.

FIG. 14 shows a fixing method to a lens 16 by ultrasonic welding. The same notations are used for the same positions as shown in FIG. 13. The lens 16 is sequentially arranged one by one from one end at a specified position in the body unit 21 shown in FIG. 14. An ultrasonic oscillator is placed above each lens 16 with a pressure applied, then ultrasonicly welded. The series of operation is applied by a control unit. The ultrasonic oscillator is equipped with a horn 57 by a columnar metal tube, and the horn 57 is in contact with the collar 16b of the lens 16 as shown in FIG. 14.

As shown in FIG. 14, ultrasonic vibration generated by an ultrasonic oscillator causes a space between a bottom 16e of the lens 16 and its facing surface C of the body unit 21 to vibrate via the collar 16b. It generates heat in the both, thereby melting a plastic portion of the bottom 16e and that of the surface C. As a result, the lens 16 is securely jointed with the body unit 21.

In this way, in a document reading apparatus with a construction above, since a lens is fixed without use of adhesive, there is hardly a case where the adhesive flows onto a lens face to interrupt a light path thereby deteriorating reading performance, or a low molecular monomer discharged therefrom sticks to a lens face, or the adhesive flies about to adhere to a lens face, thereby interrupting a light path and deteriorating reading performance.

Further, when any dirt is biten between the bottom 16e of the lens 16 and the surface C, plastic is softened by ultrasonic welding, and the dirt is wrapped in the plastic, by which deterioration of reading performance resulting from dirt can be avoided. Again, when a plurarity of lenses 16 are intagratedly molded to form a lens array body, ultrasonic welding is ensured as well.

In an experiment by the inventor and others, an acrylic lens 16 was ultrasonicly welded to a body unit 21 made of polycarbonate by frequency aided-tracking constant amplitude control system of vibration frequency 15 KHz–30 KHz. Intensity of adhesion, when measured, was more than five times the case when conventional adhesive was used in fixing. It also allowed a more stable fixing than a conventional case, and in an experiment by the inventor and others, a variation of adhesive intensity (evaluation by standard deviation) was reduced to 1/7 of such conventional fixing.

Figure 15:
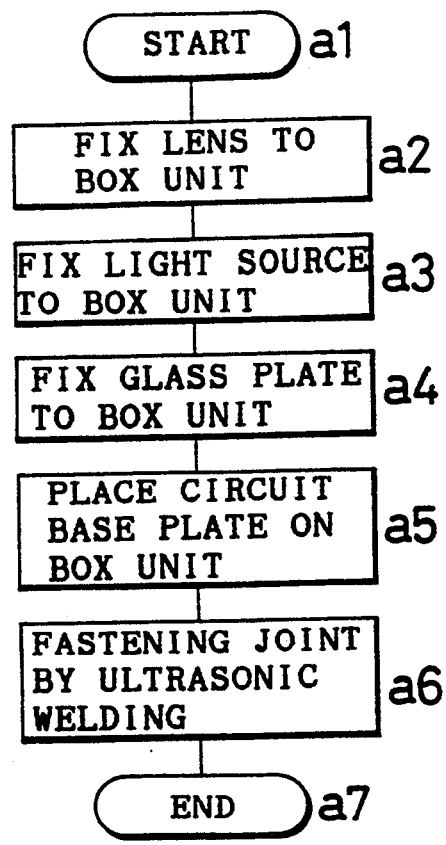
FIG. 15 is a flow chart showing an example of manufacturing process of a document reading apparatus pertaining to the invention.

Then a manufacturing method of the document reading apparatus shown in FIG. 3 will be described with reference to a flow chart shown in FIG. 15. It is started from Step a1. In Step a2, the lens 16 made of methacrylic resin for example provided with two protrusions 16c, 16d on the periphery shown in a perspective view of FIG. 13 is attached along a groove 61 of a body unit 21 consisting of thermoplastic resin or the like for example such as polycarbonate resin as shown in an enlarged perspective view of FIG. 16. Then the lens 16 and the body unit 21 are integratedly fixed by use of an ultrasonic welding method.

Then in Step a3, a light source 11 such as an LED is fixed to an inclined face 25 formed on the body unit 21. In Step a4, a light transmitting glass plate 20 to be in contact with the document 10 is mounted to the document side of the body unit 21.

Figure 16:
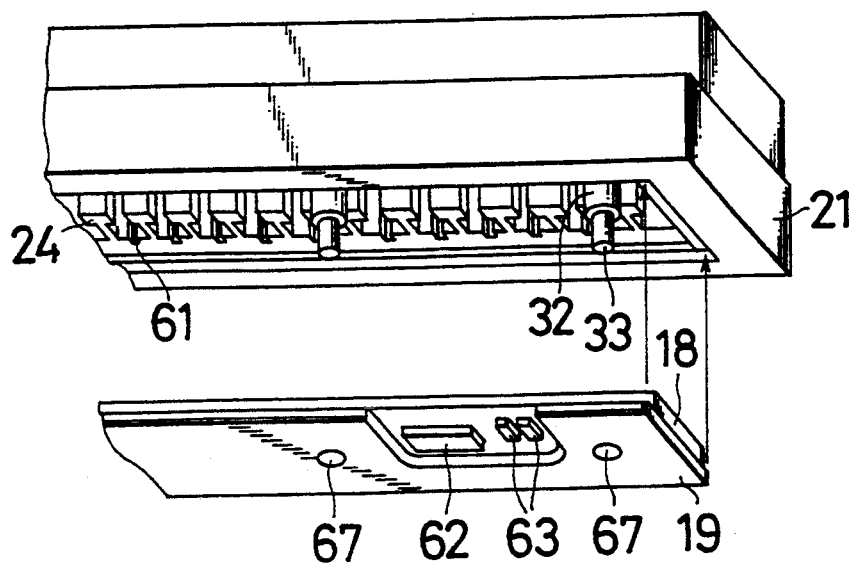
FIG. 16 is a partial perspective view showing a situation where a circuit base plate pertaining to the invention is mounted to a body unit.

Next, in Step a5, as shown in a partial perspective view of FIG. 16, prepared is a base plate 65 consisting of a circuit base plate 18 made of glass epoxy resin for example to which a semiconductor chip 17 for receiving a document image, a connector 62, an integrated circuit 63 and the like are fixed, and a bottom plate 19 of metal such as stainless steel attached thereto. A drilled hole 67 thereof and a protrusion 33 formed at the center of a pedestal 32 of the body unit 21 are engaged.

Next, in Step a6, as shown in a partially sectional view FIG. 14, a horn 57 of an ultrasonic welding apparatus lowers to apply ultrasonic to a protrusion 33 made of plastic at a specified pressure for a specified time. The protrusion 33 is softened in accordance with a form of end surface of the horn 57 to form a round head, then is hardened when application of ultrasonic is stopped, thereby fastening the base plate 65.

FIG. 16 is a partial enlarged perspective view showing the neighborhood of the pedestal 32 of the body unit 21. A light shielding member 24 is formed with its section of double-U form, and between the adjoining light shielding members 24 formed is a groove 61 to which protrusions 16c, 16d formed on the outer periphery of the lens 16 shown in FIG. 13 can be fit. An end surface of the light shielding member 24 is formed lower than the pedestal 32. Stage difference between the pedestal 32 and the end surface of the light shielding member 24 is emphasized in the figure for easiness of comprehension.

In order to form the stage difference, when a focus distance of the lens 16 is made f, level of the pedestal 32 is formed higher within a range f/40 or below with respect to the end surface of the light shielding member 24. The value f/40 is determined in total consideration of the number of apertures of the lens 16 and machining precision or assembly precision of the lens 16 and the body unit 21. For example, when the focal length f of the lens 16 is 4 mm, difference in level should preferably be within a range f/40=100 μm or below. An imaging position by the lens 16 is set at the end surface of the pedestal 32. Since the circuit base plate 18 is positioned by level of the pedestal 32, when a size of a foreign matter adhered upon the end surface of the light shielding member 24 is f/40 or below, 100 μm or below for example, even if the protrusion 33 is fastened as it is by ultrasonic pressure connection or the like thereby fixing the circuit base plate 18 as it is, the circuit base plate 18 is not deformed, and focus discrepancy or image position discrepancy is small enough to be ignored. Clearance between the circuit base plate 18 and the light shielding member 24 is so small that it does not cause stray light or disturbance.

In the embodiments above, an example is used for description where the protrusion 33 is fastened by ultrasonic pressure connection in installing the circuit base plate 18 to the body unit 21, fixing by screws or rivets and fixing by adhesive are also applicable.

Figure 17:
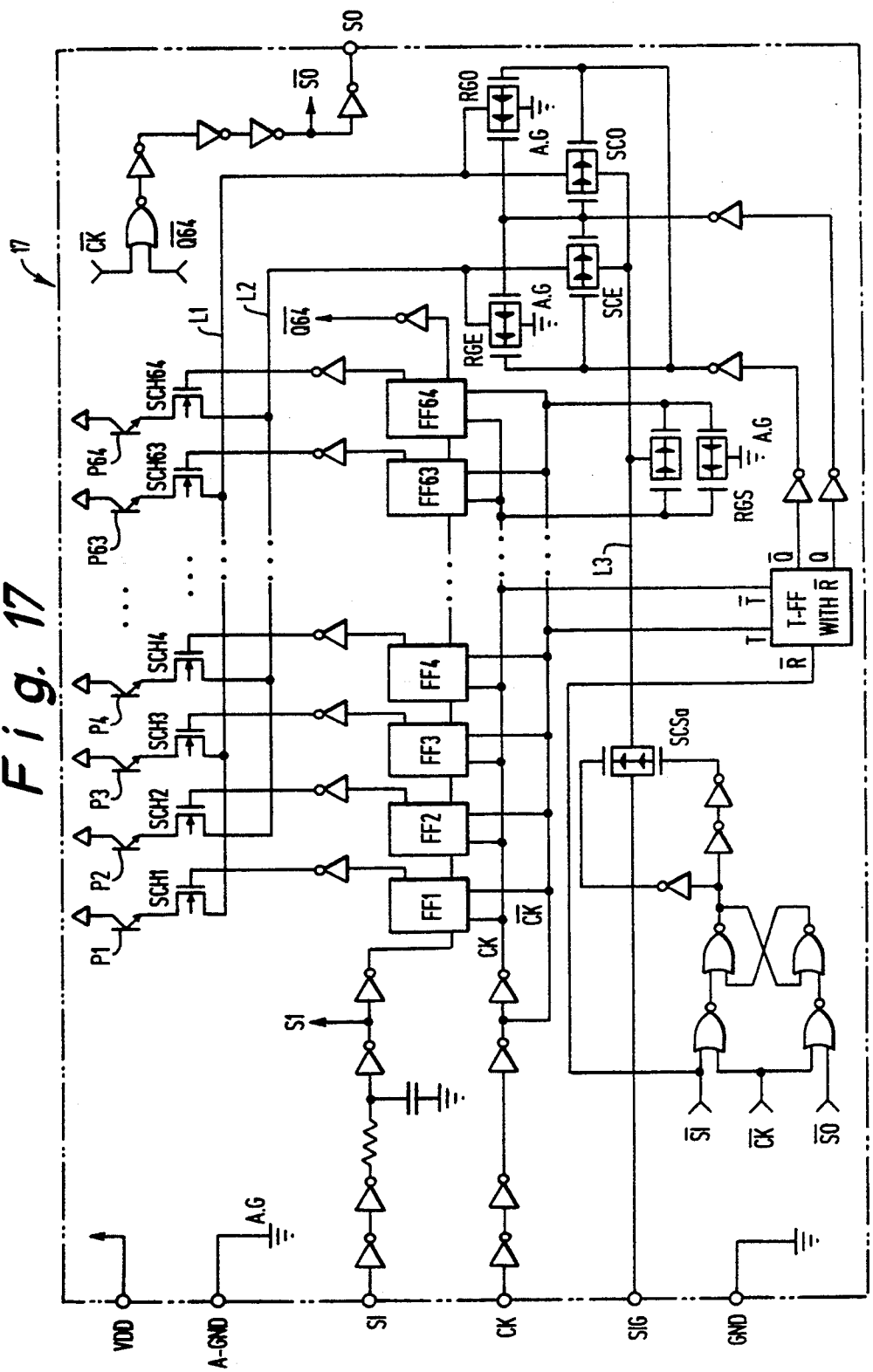
FIG. 17 is an electric circuit diagram showing an electric construction of a semiconductor chip pertaining to the invention.

FIG. 17 is a circuit diagram showing an electric construction of the semiconductor chip 17 shown in FIG. 3. Sixty-four photoelectric transducer elements P1 to P64 are connected to common lines L1 and L2 every two apart respectively through switching elements SCH1 to SCH64, each of which is connected to the other common line L3 through analogue switches SCE and SCO, and are connected to a terminal SIG through an analogue switch SCSa. On the otherhand, switching elements SCH1 to SCH64 are driven by a shift register and an inverter consisting of sixty-four flip-flops FF1 to FF64.

The operation will be described generally. When a scan start signal changing in a pulse form is input from a terminal SI, repective flip-flops FF1 to FF 64 are sequentially inverted in level in synchronization with a clock input from a terminal CK, and each switching element SCH1 to SCH64 conducts sequentially one by one. Then each photoelectric transducer element P1 to P64 is sequentially scanned, and an electric signal in proportion to the amount of received light is output either to the common line L1 when the number is odd or to the common line L2 when the number is even. Further, on the basis of a clock input from the terminal CK, the analogue switches SCE and SCO repeat connection of the common lines L1 and L2 with the common line L3 alternately, which is still further connected to the terminal for a specified time by the analogue switch SCSa. On the other hand, output from the flip-flop FF 64 is shaped in waveform and output to an terminal SO as a scan completion signal. A document image received by each photoelectric transducer element P61 to P64 is thus scanned and converted to a read signal in time series.

Figure 18:
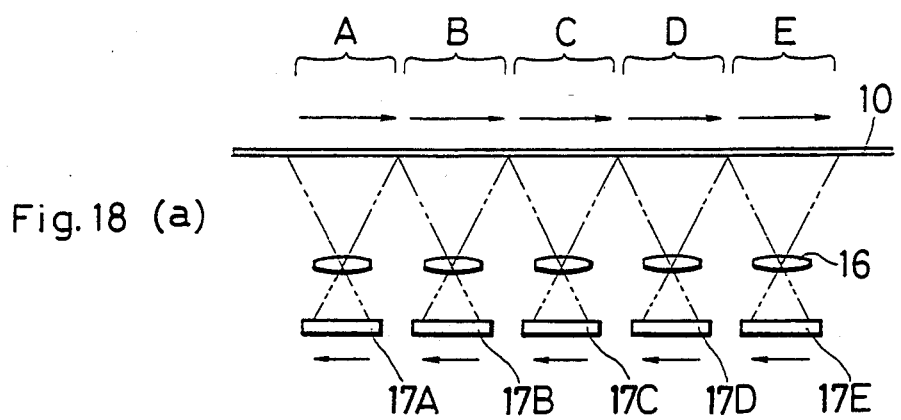
FIG. 18a is a schematic side view showing an optical system of a document reading apparatus.
FIG. 18b is a partial plan view showing a state where a semiconductorchip is mounted to a circuit base plate.
FIG. 18c is its partial enlarged view.
Figure 18:
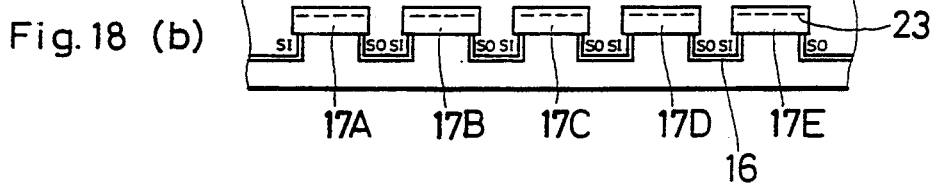
Figure 18:
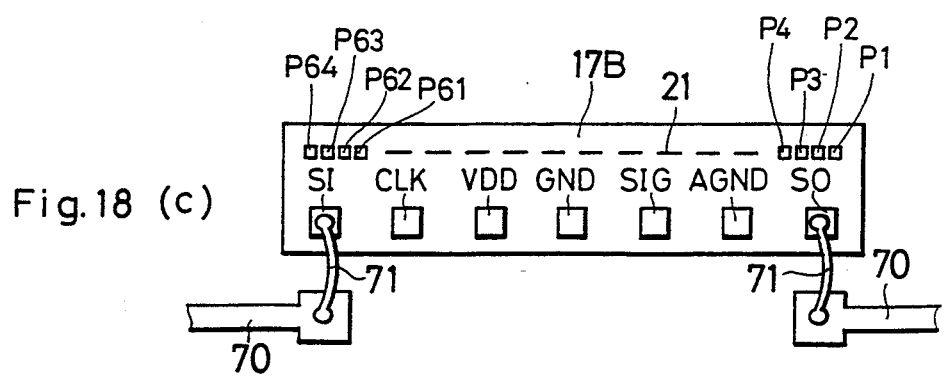

FIG. 18a is a schematic construction view showing an optical system of the document reading apparatus shown in FIG. 3. A plurality of lenses 16 arranged in line at a specified interval image the light reflected from a document 10 dividing into a plurality of regions A to E, and form an inverted document image. The document image is received by a semiconductor chip 17 having a multiplicity of photoelectric transducer elements P1 to P64, and the photoelectric transducer elements are sequentially scanned, by which output is a read signal in time series corresponding to image information of a document.

FIG. 18b is a partial plan view showing a state where a semiconductor chip 17 is fixed to a circuit base plate 18, and FIG. 18c is its partial enlarged view. The semiconductor chip 17 has a light receiving face 23 consisting of sixty-four photoelectric transducer elements P1 to P64, a terminal SI to which a scan start signal is input, a terminal CLK to which a scan clock signal is input, a terminal VDD to which power supply is connected, a ground terminal GND, a terminal SIG for outputting a read signal, a ground terminal for analogue circuit AGND, and a terminal SO for outputting a scan completion signal. Neighboring semiconductor chips 17 are connected electrically by their mating terminal SO and SI through a wiring pattern 70 and a bonding wire 71.

When scanning a document in the order of region A, B, C, D, E, first a scan start signal is input to the terminal SI of a semiconductor chip 17A, sixty-four photoelectric transducer elements P1 to P64 are scanned and a read signal is output from the terminal SIG, then a scan completion signal is output from the terminal SO, and input to the terminal SI of a neighboring semiconductor chip 17B as a scan start signal. Subsequently, scan of photoelectric transducer elements P1 to P64 of the semiconductor chip 17B is started, and a read signal is output from the terminal SIG, then a scan completion signal is output from the terminal SO, and input to the terminal SI of next neighboring semiconductor chip 17C. Such an operation is repeated hereafter, by which a read signal for one scan line of the document 10 is output in time series.

As shown above, when a scan direction of photoelectric transducer elements P1 through P64 is opposite to a direction for driving semiconductor chips 17A through 17E sequentially, the respective terminal SO and SI of adjoining semiconductor chips 17 are close to each other, therefore the wiring pattern 70 can be made short and simple in form. The shorter becomes pattern 70 on the base plate 18, the less cross-talk noise is induced.

FIG. 19 is a circuit diagram showing an electric construction of the document reading apparatus shown in FIG. 3. The document reading apparatus comprises a plurality of photoelectric transducer elements P1 to Pn (n: Natural number, e.g., 64. The same hereafter) such as photo transistors or photo diodes, a common signal line CL commonly connecting outputs from the photoelectric transducer elements P1 to Pn, a plurality of switching elements SW1 to SWn such as a transistor or an analogue switch intervening between each photoelectric transducer element P1 to Pn and the common signal line CL, and a shift register 75 which is a scan circuit for driving each switching element SW1 to SWn sequentially, or the like. Further, to the common signal line CL connected in series are a capacitor 76 for an integrator, a switching element 77 for forcibly setting a potential to a ground potential during blanking when no read signal is output, an inverter 78 for capacitively coupling an opposite phase signal to a clock signal CLK which is a principal noise source, and a capacitor 79, and a signal through the common signal line CL is input to a non-inverting amplifier consisting of an operational amplifier 80 and resistors 81, 82. A variable resistor 83 is provided for zero adjustment of the operational amplifier 80, further an amplification gain of the non-inverting amplifier can be adjusted through control of the resistor 81.

The operation will be discribed with reference to timing charts in FIG. 20a to 20f. When the light reflected from the document 10 is imaged by the lens 11 and received by each photoelectric transducer element P1 to Pn of each image sensor 17, a photoelectromotive force in proportion to the amount of received light is generated. On the other hand, when a scan start signal SI is input to the shift register 75, fall of a clock is detected in synchronization with a clock signal CLK shown in FIG. 20a and pulse signals from D1 to Dn as shown in FIG. 20b to FIG. 20d are output, whereby the switching elements SW1 to SWn conduct sequentially. Then an electric signal in accordance with a photoelectromotive force generated by each photoelectric transducer element P1 to Pn is output to the common signal line CL in time series, amplified to a specified level by the operational amplifier 75, and output as a read signal SIG as shown in FIG. 20e. It is set to a ground potential 0V as the switching element 77 conducts during a blanking period when the clock signal CLK has a high level.

Next described will be the case where the amount of received light at each photoelectric element P1 to Pn is small. In this case, generation of a photoelectromotive power is small, and the common signal line CL has a high impedance, and a crosstalk noise resulting mainly from the clock signal CLK is likely to be superimposed to the common signal line CL by an influence of floating capacity and insulation resistance of a circuit base plate. However, the common signal line CL is capacitively coupled via the capacitor 79 with a signal of phase inverted against the clock signal CLK by the inverter 78. When level of this signal agrees with signal level of a crosstalk noise, the both are canceled with each other, providing a read signal SIG with a good S/N ratio as shown in FIG. 20f. Capacitance of the capacitor 79 is chosen at nearly the same level as floating capacity between the common signal line CL and a clock signal line which is a principal noise source.

In FIG. 19, a variable resistor intervenes between the capacitor 79 and the inverter 78, serving as a level adjusting means. Adjusting this variable resistor 84 enables the amplitude of crosstalk noise superimposed upon the common signal line CL to precisely agree with that of an opposite phase signal supplied by capacitive coupling of the capacitor 79. Therefore, in a read signal SIG when the amount of light received by each photoelectric transducer element P1 to Pn is small (FIG. 20f), crosstalk is further cleared, providing a very good S/N ratio. Capacitance of the capacitor 79 is chosen at a few times as large as floating capacity between the common signal line CL and a clock signal line which is a principal noise source, allowing an easy and speedy level adjustment by the variable resistor 84.

Then a preferred embodiment of a document reading apparatus shown in FIG. 19 will be described. Frequency of clock signal CLK was set at 500 KHz (period $2\mu$ sec), a product named LF357 by National Semiconductor Co., Ltd. is employed as an operational amplifier 80, an analogue switch named 2SK620 by Matsushita Electric Industrial Co., Ltd. is employed as a switching element 77, a resistor 81 is set at 1kΩ, a resistor 82 is set at 10kΩ, a capacitor 76 for absorbing noise is set at 1000 pF, further a capacitor 79 is set at 20 pF and a resistor 84 at approximately 1kΩ since a coupling capacity between a common signal line, CL and a clock signal line, which is a principal noise source, is approximately 7pF, then a read signal SIG with an excellent S/N is provided.

Figure 21:
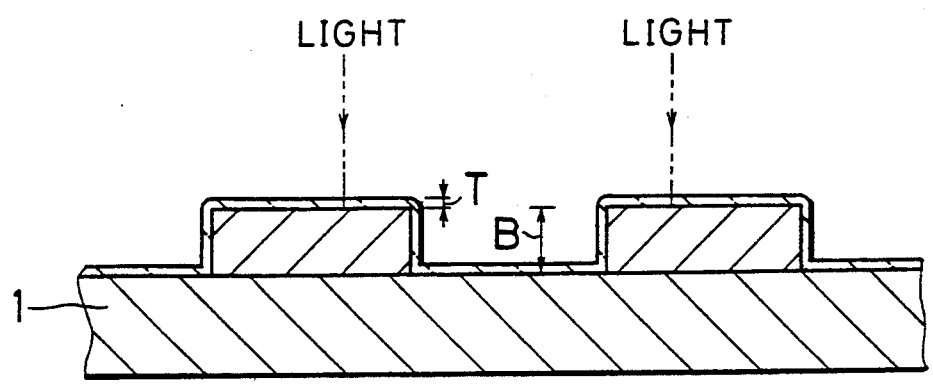
FIG. 21 is a partial sectional view showing the vicinity of a semiconductor chip.

FIG. 21 is a partially sectional view nearby a semiconductor chip 17. On the surface of the semiconductor chip 17 with a height B approximately 0.4 mm and the circuit base plate 18 formed is a light transmitting resin layer 86 with a film thickness T approximately 100 $\mu$m or below such as silicon resin, epoxy resin, polyether amide for preventing deterioration and for taking a environmental measure. As a result, the surface of the light transmitting resin 86 can be made flat without influence by clearance between the semiconductor chips 17. Especially, the light transmitting resin 86 on the semiconductor chip 17 generates no optical defect. Therefore, scattering or attenuation of light at the light transmitting resin 86 is reduced, which improves a reading sensitivity and an image resolution such as MTF. In addition, distortion of image and variation of sensitivity can be restrained since unevenness of the surface is reduced.

Next described in the concrete will be a method for forming the light transmitting resin 86 on the surface of a semiconductor chip and the circuit base plate 18 using silicon resin as an example. Firstly silicon resin was dissolved to a concentration of 7 weight % using n-heptane as a solvent, then the viscosity was 1.3 cSt (room temperature 25° C.). Next, a drip of dissolved silicon resin was dropped from above the semiconductor chip 17 with a dispenser or the like for spotted application, then it was put into a heating bath and heated at a temperature 150° C. for an hour to be hardened, then a light transmitting resin 22 was formed with a hardness 18 (JIS-A) and a dielectric breakdown voltage 20 kV/mm.

The thickness of the light transmitting resin 86 obtained was measured by an interference film thickness gauge, then an average film thickness x=13.6 $\mu$m and a standard deviation $\delta$=2.1 $\mu$m were obtained with a sample number n=16, where a transmission ratio was 92.7% with a wave length $\lambda$=550 $\mu$m.

In the same way, in forming the light transmitting resin 86 with a film thickness 1 μm and 5 μm, silicon resin was spottedly applied and hardened with its concentration 3 weight % under the same condition as the above. As for a film thickness 50 μm and 100 μm, silicon resin with a concentration 7 weight % was spottedly applied a multiplicity of times and hardened. In order to form resin of a film thickness 0.5 mm, 0.8 mm, and 1.0 mm for comparison, silicone resin with a concentration of 100 weight % undissolvable in solvent was spottedly applied and hardened.

MTF (Modulation Transfer Function) showing a space resolution and PRNU (Photo Response Non-Uniformity) showing a sensitivity variation were measured of a semiconductor chip 20 thus obtained on which the light transmitting resin 22 of a film thickness 1 μm, 5 μm, 10 μm, 50 μm, 100 μm, 0.5 mm, 0.8 mm, and 1 mm is formed, and further a reliability test was carried out.

Figure 22:
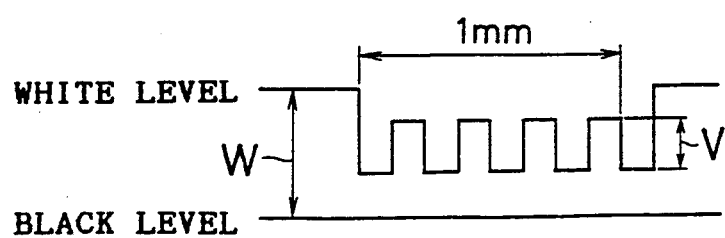
FIG. 22 is a graph showing definition of MTF.

MTF, as shown in FIG. 22, was calculated by dividing an amplitude V at a space frequency 4 LP/mm where four sets of black and white of rectangular waves exist per millimeter by an amplitude W when white background was read, and multiplying it by 100, namely using the following definition formula:

$$MTF(\%) = \frac{V}{W} \times 100 \quad (1)$$

The larger an MTF is, the better is a resolution.

On the other hand, PRNU indicating a variation of sensitivity within a piece of semiconductor chip 17 was calculated by the following definition formula, where VMAX is the maximum value of output when coated paper having an optical density OD of 0.07 was read and VMIN is the minimum value of output when coated paper having an optical density OD of 0.07 was read:

$$PRNU(\%) = \frac{VMAX - UMIN}{UMAX + UMIN} \times 100 \quad (2)$$

The smaller a PRNU is, the smaller is a variation of sensitivity.

Further, in a reliability test, the resin was left in the atmosphere of temperature 85° C. and humidity 85% for accelerated deterioration for 500 hours, and presence of an abnormality such as electrode corrosion was examined.

The result of these tests is shown in table 1 below:

TABLE 1

| Film thickness | MTF (%) | PRNU (%) | Reliability |
|---|---|---|---|
| 1.0 mm | 40 | 29 | ○ |
| 0.8 mm | 47 | 19 | ○ |
| 0.5 mm | 53 | 13 | ○ |
| 100 μm | 60 | 7 | ○ |
| 50 μm | 63 | 7 | ○ |
| 10 μm | 65 | 5 | ○ |
| 5 μm | 70 | 3 | ○ |
| 1 μm | 73 | 3 | X (Corrosion generated) |

In view of the above result, when it is considered that a characteristic required for a facsimile apparatus or an image scanner apparatus is MTF 60% or above and PRNU 10% or below, it is understood that a film thickness of the light transmitting resin 22 formed on a surface of the semiconductor chip 20 should preferably be approximately 100 μm or below. On the other hand, too small a thickness reduces a reliability, and the film thickness should preferably be approximately 5 μm or above.

Figure 23:
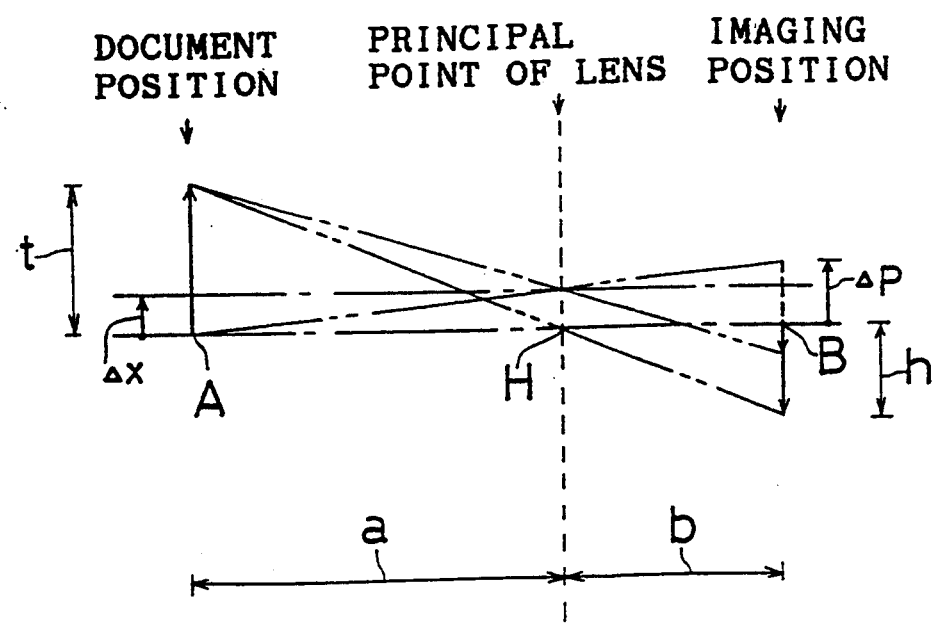
FIG. 23 is a concept view showing an optical system of a document reading apparatus.

Next described will be adjustment procedure of an optical system. In FIG. 23, a distance from a document position A to a lens principal point H is assumed a; a distance from a lens principal point H to an imaging position B is b; a horizontal magnification is M; a length from an optical axis to a document reading area is t; a length from an optical axis to an imaging area of a document image is h, then parallelism of triangles leads to the following equation:

$$M = \frac{h}{t} = \frac{b}{a} \quad (3)$$

On the other hand, when the lens 16 is shifted by Δx in a direction perpendicular to a line AB, the following equation is obtained where shift of imaging position is ΔP:

$$\frac{\Delta x}{a} = \frac{\Delta P}{a+b} \quad (4)$$

When the formula (4) is developed with respect to ΔP, it leads to the following equation:

$$\Delta P = \frac{a+b}{a} \times \Delta x = \left(1 + \frac{b}{a}\right) \times \Delta x = (1 + M) \times \Delta x \quad (5)$$

In the above formula, shift of imaging position ΔP with reference to a reading position of the document 10 can be obtained by (1+M)×Δx. In the same way, when the lens 16 is shifted by Δy in a direction perpendicular to a sheet face in FIG. 23, shift of imaging position ΔQ with reference to a reading position of the document 10 can be calculated by (1+M)×Δy.

Figure 24:
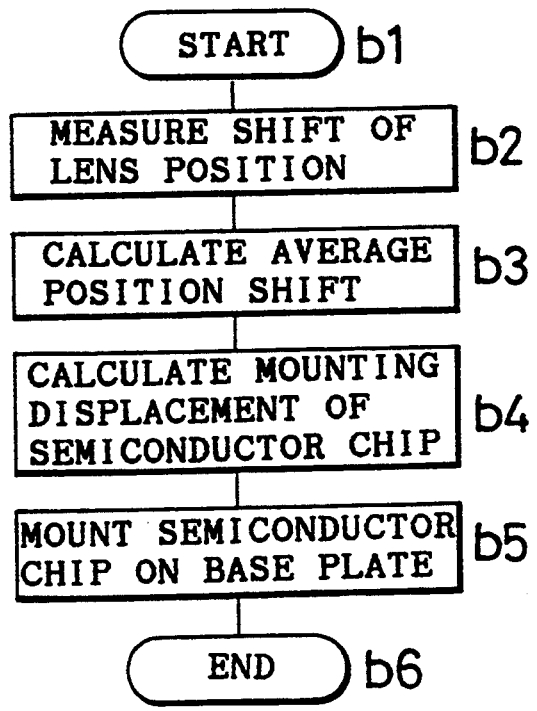
FIG. 24 is a flow chart showing an example of manufacturing method of a document reading apparatus.

FIG. 24 is a flow chart showing an embodiment of a document reading apparatus manufacturing method. First, it is started in Step b1. In Step b2, the lens 16 is attached to the body unit 21. Then it is placed on a XY table having a linear scale of precision approximately μm, and position shifts of each lens 16 x, Δy are measured by use of a microscope or a magnifying projector. The body unit 21, when it is processed by injection molding for example, is molded under the same condition and in the same die within the same slot, thereby providing a repeated processing error in a highly precise range from ±2 μm to ±3 μm. Accordingly, several to several tens of body units in the same lot should preferably be sampled, and position shifts Δx, Δy of each lens measured, and in the next Step b3, the average calculated thereby restraining an influenc by a measuremen as much as possible.

Then in Step b4, on the basis of horizontal magnification M of a reading optical system and position shifts Δx, Δy of each lens 16 obtained above, packaging displacements ΔP, ΔQ of each semiconductor chip 17 corresponding respectively to each lens 16 are calculated by relations ΔP=(1+M)×Δx and ΔQ=(1+M)×Δy.

Then in Step b5, packaging displacements ΔP, ΔQ of each semiconductor chip 17 obtained as shown above are reported to a packaging apparatus such as a die bonder, and each semiconductor chip 17 is packaged on the base plate 18. A die bonder used in the invention generally comprises a process to apply adhesive to a specified position of a base plate 18 placed on XY table, a process to take out a light receiving element from a tray where light receiving elements are arranged and chuck again as long as packaging displacements ΔP, ΔQ starting from a reference point with a positioning means named "precenter" consisting of a CCD camera and an XY stage, and a process for packaging a light receiving element positioned by packaging displacement ΔP, ΔQ by use of pre-centering onto a position on a base plate where adhesive is applied.

In such a way, a mounting position of each light receiving element is determined corresponding to position shifts of each lens Δx, Δy, thereby providing a high quality image signal without position shift.

Glass epoxy resin composing the circuit base plate 18 has a linear expansion coefficient of $15 \times 10^{-6} \sim 30 \times 10^{-6} K^{-1}$, which is substantially equal to a linear expansion coefficient of the body unit 21 supporting the lens 16. In reading a document, when electric power is applied to the conductor pattern 70 or the light source 1 on the circuit base plate 18 whereby a document reading apparatus acquires a high temperature due to module heat generated by application of the electric power, the circuit base plate 18 and the body unit 21 expand thermally by a substantially equal amount. As a result, the semiconductor chip 17 placed on the circuit base plate 18 and the lens 16 supported by the body unit 21 are always properly positioned, and no position shift between the both is generated essentially, leading to a correct reading of the document 10.

A linear expansion coefficient of the circuit base plate 18 on which the semiconductor chip 17 is placed is assumed $\rho_1$, a linear expansion coefficient of the body unit 21 supporting the lens 16 is $\rho_2$, a difference between a temperature when the semiconductor chip 17 and the lens 16 are correctly positioned and a temperature when electric power is applied to a document reading apparatus to generate a high temperature is ΔT, an array interval of the semiconductor chips 17 when the semiconductor chip 17 and the lens 16 are properly positioned is D, and a scale-down ratio of reflected light radiated on the semiconductor chip 17 against the document 10 is 1/M. At this time, shown by the following equation is a region d where reading of the document 10 is impossible due to position shift generated in reading the document 10 between the lens 16 supported by the body unit 21 and the semiconductor chip 17 placed on the circuit base plate 18:

$$d = D \cdot \rho_1 \cdot \Delta T + D \cdot (M+1) \cdot (\rho_2 - \rho_1) \cdot \Delta T \quad (6)$$

For example, when a linear expansion coefficient $\rho_1$ of glass epoxy resin constituting the circuit base plate 18 is $22.5 \times 10^{-6} K^{-1}$, a linear expansion coefficient $\rho_2$ of glass fiber reinforced plastic constituting the body unit 21 is $17 \times 10^{-6} K^{-1}$, an array interval D of the semiconductor chip 17 is 8 mm, scale-down ratio 1/M of reflected light radiated upon the semiconductor chip 17 against the document 10 is 0.4, and a temperature difference ΔT is 25K, then the following equation is obtained:

$$d = 8 \text{ mm} \cdot 22.5 \times 10^{-6} K^{-1} \cdot 25K + 8 \text{ mm} \cdot (1/2.5+1) \cdot (17 \times 10^{-6} K^{-1} - 22.5 \times 10^{-6} K^{-1}) \cdot 25K \quad (7)$$

$$d = 0.00065 \text{ mm} \quad (8)$$

As is shown, the region d where the document cannot be read is extremely small, absent essentially.

The circuit base plate 18 composed of the glass epoxy resin is manufactured by pouring sol epoxy resin into glass fiber, then hardening the epoxy resin, and a plurality of semiconductor chips 17 are placed and fixed thereupon in line via adhesive consisting of epoxy resin and polyimide or the like.

As is shown, a document reading apparatus described above works as such when the light source projects light onto the document 10, reflected light thereof is radiated via the lens 16 upon the photoelectric transducer element 17 formed upon the semiconductor chip 17a, and photoelectric transformation is caused corresponding to the light radiated upon each photoelectric transducer element 17a.

When the light source 11 is positioned between adjacent lenses 16 at an equal distance from each lens 16, and reflected light from the document 10 corresponding to a portion with a great amount of light from the light source 11 enters the lens 16 at a large angle. Reflected light from the document 10 corresponding to a portion with a small amount of light from the light source 11 enters the lens 16 at a small angle. As a result, unevenness of light amount generated by an incident angle of reflected light entering the lens 16 is cancelled each other by the light amount of reflected light entering the lens 16 in a compensating manner. It enables a substantially uniform light to be radiated upon the photoelectric transducer element 17a upon the semiconductor chip 17, thereby causing a correct photoelectric transformation of each photoelectric transducer element 17 and improving a reading precision of document image information.

The invention is not restricted to the above embodiments, but can be changed and modified variously in a range not deviating from a subject matter of the invention. For example, the body unit 21 and the circuit base plate 18 may adopt any material having substantially the same coefficient of linear expansion, and when an electrical insulating material of the circuit base plate is composed of glass epoxy resin, the body unit 21 may be formed of glass fiber reinforced nylon, glass fiber reinforced polyphenylene sulfide resin, and glass fiber reinforced acrylonitrile-butadiene-styrene copolymer, or mixture of at least two chosen from these materials, in addition to glass fiber reinforced plastic.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An apparatus for reading a document, comprising:
   at least one light source positioned for illuminating the document,
   a substantially linearly arranged plurality of lenses positioned at predetermined intervals for imaging light reflected from the document and forming a reduced image of the document, the plurality of lenses defining a first direction
   a substantially linearly arranged plurality of semiconductor chips having a plurality of photoelectric transducer elements arranged for receiving an image of the document, each one of the plurality of chips being associated with a corresponding one of the plurality of lenses, and a body unit for holding the light source and the plurality of semiconductor chips and for defining a substantially shielded light path from the document to each of the semiconductor chips through each of the corresponding lenses, the at least one light source comprising a plurality of light-emitting elements arranged substantially parallel to the first direction, at least one of the plurality of light-emitting elements being arranged substantially between and substantially equidistant from two adjacent lenses.

2. The apparatus of claim 1, comprising a light transparent resin layer having a thickness below approximately 100 μm formed on a surface of at least one of the plurality of semiconductor chips and the circuit wiring base plate.

3. The apparatus of claim 1, wherein the body unit defines an inner surface comprising means for shielding at least one of the lenses from direct entry of light from the at least one light source.

4. The apparatus of claim 1, wherein at least one of the lenses is formed of transparent high polymer material, wherein the body unit is formed of high polymer material, and wherein the lens formed of transparent high polymer material and the body unit are adhesively fixed by ultrasonic welding.

5. The apparatus of claim 1, comprising:
a circuit wiring base plate held by the body unit for supporting the plurality of semiconductor chips, the circuit wiring base plate defining a coefficient of linear expansion, the body unit defining a coefficient of linear expansion, the coefficient of linear expansion of the circuit wiring base plate and the coefficient of linear expansion of the body unit being substantially equal.

6. The apparatus of claim 5, wherein the circuit wiring base plate comprises electric insulation material selected from a group consisting of reinforced glass fiber epoxy resin, paper phenol resin, or paper epoxy resin, the circuit wiring base plate defining a front side and a rear side, the plurality of semiconductor chips being arranged on the front side of the circuit wiring base plate, and further comprising:
a reinforcing plate fixed to the rear side of the circuit wiring base plate, the reinforcing plate comprising at least one of a metal material and a plastic material.

7. The apparatus of claim 5, comprising:
a pedestal provided on the body unit and configured to receive the circuit wiring base plate, the pedestal defining an end surface,
a light shielding member for shielding at least one of the plurality of lenses, the at least one of the plurality of lenses having a focal length f, the light shielding member defining an end surface,
the end surface of the light shielding member and the end surface of the pedestal being mutually spaced by a distance that is less than approximately f/40.

8. An apparatus for reading a document, comprising:
at least one light source positioned for illuminating the document,
a substantially linearly arranged plurality of lenses positioned at predetermined intervals for imaging light reflected from the document and forming a reduced image of the document,
a substantially linearly arranged plurality of semiconductor chips having a plurality of photoelectric transducer elements arranged for receiving an image of the document, each one of the plurality of chips being associated with a corresponding one of the plurality of lenses, and
a body unit for holding the light source and the plurality of semiconductor chips and for defining a substantially shielded light path from the document to each of the semiconductor chips through each of the corresponding lenses.
wherein the at least one light source defines a luminescent point and a luminescent plane,
wherein at least one of the lenses defines an object point,
wherein the luminescent point and the object point define a first straight line,
wherein at least one of the lenses defines an object principle point,
wherein the object point and the object principle point define a second straight line,
wherein the second straight line and the luminescent plane define an intersection point,
wherein the luminescent point and the intersection point define a third straight line,
wherein the first straight line and the third straight line define an angle $\eta$, and wherein $\eta$ is greater than $90°$.

9. The apparatus of claim 8, wherein the second straight line and the intersection point define a perpendicular plane, the perpendicular plane being perpendicular to the second straight line and intersecting the intersection point, wherein the luminescent plane and the perpendicular plane define an angle $\phi$, and wherein $\phi \geq 45°$.

10. An apparatus for reading a document, comprising:
at least one light source positioned for illuminating the document,
a substantially linearly arranged plurality of lenses positioned at predetermined intervals for imaging light reflected from the document and forming a reduced image of the document,
a substantially linearly arranged plurality of semiconductor chips having a plurality of photoelectric transducer elements arranged for receiving an image of the document, each one of the plurality of chips being associated with a corresponding one of the plurality of lenses, and
a body unit for holding the light source and the plurality of semiconductor chips and for defining a substantially shielded light path from the document to each of the semiconductor chips through each of the corresponding lenses,
wherein the body unit defines a sidewall facing at least one of the light paths from the document to at least one of the lenses, and comprising means for preventing scattered light generated on the sidewall from entering the lens.

11. The apparatus of claim 10 wherein the means for preventing scattered light generated on the sidewall from entering the lens comprises at least one protrusion extending from the sidewall.

12. The apparatus of claim 10 wherein the means for preventing scattered light generated on the sidewall from entering the lens comprises at least one step-like indentation in the sidewall.

13. The apparatus of claim 10, wherein at least a portion of the sidewall is blackened and matted.

14. An apparatus for reading a document, comprising:
   at least one light source positioned for illuminating the document,
   a substantially linearly arranged plurality of lenses positioned at predetermined intervals for imaging light reflected from the document and forming a reduced image of the document,
   a substantially linearly arranged plurality of semiconductor chips having a plurality of photoelectric transducer elements arranged for receiving an image of the document, each one of the plurality of chips being associated with a corresponding one of the plurality of lenses, each of the photoelectric transducer elements defining an output,
   a body unit for holding the light source and the plurality of semiconductor chips and for defining a substantially shielded light path from the document to each of the semiconductor chips through each of the corresponding lenses,
   a common signal line commonly connecting the outputs of each of the photoelectric transducer elements, the common signal line having a noise signal superimposed thereon, the noise signal having a phase,
   a plurality of switching elements interposed between each of the photoelectric transducer elements and the common signal line,
   a scan circuit for sequentially driving each of the plurality of switching elements, and
   means for applying to the common signal line a signal having a phase that is opposite to the phase of the noise signal.

15. An apparatus for reading a document, comprising:
   at least one light source positioned for illuminating the document,
   a substantially linearly arranged plurality of lenses positioned at predetermined intervals for imaging light reflected from the document and forming a reduced image of the document,
   a substantially linearly arranged plurality of semiconductor chips having a plurality of photoelectric transducer elements arranged for receiving an image of the document, each one of the plurality of chips being associated with a corresponding one of the plurality of lenses, and
   a body unit for holding the light source and the plurality of semiconductor chips and for defining a substantially shielded light path from the document to each of the semiconductor chips through each of the corresponding lenses, the body unit being provided with a light transmitting plate defining a surface and a downstream direction, and further comprising
   a document guide positioned substantially adjacent the downstream side of the light transmitting plate, the document guide defining a section that is inclined at an angle $\theta$ relative to the surface of the light transmitting plate, the angle $\theta$ being not greater than approximately 45°.

* * * * *